(12) United States Patent
Kato

(10) Patent No.: US 11,135,600 B2
(45) Date of Patent: Oct. 5, 2021

(54) ROTARY JOINT AND CENTRIFUGAL SEPARATOR

(71) Applicant: FUJIFILM Corporation, Tokyo (JP)

(72) Inventor: Nobuhiko Kato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/505,941

(22) Filed: Jul. 9, 2019

(65) Prior Publication Data

US 2019/0329272 A1 Oct. 31, 2019

Related U.S. Application Data

(63) Continuation of application No. PCT/JP2018/000329, filed on Jan. 10, 2018.

(30) Foreign Application Priority Data

Jan. 10, 2017 (JP) .............................. JP2017-002147

(51) Int. Cl.
*B04B 15/00* (2006.01)
*B04B 5/02* (2006.01)
(Continued)

(52) U.S. Cl.
CPC ................ *B04B 15/00* (2013.01); *B04B 5/02* (2013.01); *B04B 11/02* (2013.01); *F16L 27/087* (2013.01); *F16L 39/06* (2013.01)

(58) Field of Classification Search
CPC ........... B04B 15/00; B04B 5/02; B04B 11/02; B04B 5/0442; F16L 27/087; F16L 39/06
(Continued)

(56) References Cited

U.S. PATENT DOCUMENTS

| 2,547,106 A | * | 4/1951 | Zachariassen | ............ B04B 1/00 |
| | | | | 285/9.2 |
| 3,561,672 A | * | 2/1971 | Schlutz | ............... A61M 1/3693 |
| | | | | 494/1 |

(Continued)

FOREIGN PATENT DOCUMENTS

| CN | 101227982 A | 7/2008 |
| CN | 101352747 A | 1/2009 |

(Continued)

OTHER PUBLICATIONS

International Preliminary Report on Patentability and Written Opinion of the International Searching Authority (forms PCT/IB/373, PCT/ISA/237 and PCT/IB/326), dated Jul. 25, 2019, for corresponding International Application No. PCT/JP2018/000329, with a Written Opinion translation.

(Continued)

*Primary Examiner* — Charles Cooley
(74) *Attorney, Agent, or Firm* — Birch, Stewart, Kolasch & Birch, LLP

(57) ABSTRACT

A rotary joint which supplies and discharges a liquid to and from a container which is revolved around a rotation axis, the rotary joint includes: a shaft body which is immovably provided; a tube body into which the shaft body is inserted and which is rotated around the shaft body; a shaft-side supply flow path; a shaft-side discharge flow path; a tube-side supply flow path; a tube-side discharge flow path; a supply communication flow path; and a discharge communication flow path, the tube-side supply flow path is inclined, and the tube-side discharge flow path is inclined.

11 Claims, 15 Drawing Sheets

(51) Int. Cl.
  *B04B 11/02* (2006.01)
  *F16L 27/087* (2006.01)
  *F16L 39/06* (2006.01)

(58) Field of Classification Search
  USPC .......................................................... 494/41
  See application file for complete search history.

(56) References Cited

U.S. PATENT DOCUMENTS

| | | | |
|---|---|---|---|
| 3,672,564 | A | 6/1972 | Schlutz et al. |
| 4,098,455 | A * | 7/1978 | Ammann ............... B04B 5/0442 239/264 |
| 4,098,456 | A * | 7/1978 | Bayham ................ B04B 5/0442 494/17 |
| 4,288,106 | A | 9/1981 | Foolen |
| 4,377,253 | A * | 3/1983 | Bruneel ................ B04B 5/0442 422/521 |
| 4,391,298 | A | 7/1983 | Ortloff |
| 4,756,559 | A | 7/1988 | Shimada et al. |
| 5,372,945 | A * | 12/1994 | Alchas ................... C12M 45/09 494/36 |
| 10,634,272 | B2 * | 4/2020 | Takeda |
| 2001/0002743 | A1 * | 6/2001 | Jorgensen ............ A61M 1/3696 277/399 |
| 2008/0087613 | A1 | 4/2008 | Hudock et al. |
| 2008/0090714 | A1 | 4/2008 | Hudock et al. |
| 2008/0096749 | A1 | 4/2008 | Hlavinka et al. |
| 2009/0317305 | A1 | 12/2009 | Hudock et al. |
| 2010/0210441 | A1 | 8/2010 | Dolecek |
| 2010/0273627 | A1 | 10/2010 | Hudock et al. |
| 2019/0329271 | A1 * | 10/2019 | Kato ..................... B04B 5/0407 |
| 2019/0329272 | A1 * | 10/2019 | Kato ..................... F16L 27/087 |

FOREIGN PATENT DOCUMENTS

| | | |
|---|---|---|
| CN | 103104772 A | 5/2013 |
| CN | 203036174 U | 7/2013 |
| EP | 2821643 A1 | 1/2015 |
| JP | 55-112481 A | 8/1980 |
| JP | 58-108688 U | 7/1983 |
| JP | 58-170585 A | 10/1983 |
| JP | 61-21492 A | 1/1986 |
| JP | 62-204090 A | 9/1987 |
| JP | 2001041618 A * | 2/2001 |
| JP | 2011-106593 A | 6/2011 |
| JP | 2012-96154 A | 5/2012 |
| JP | 2014-234836 A | 12/2014 |

OTHER PUBLICATIONS

International Search Report (form PCT/ISA/210), dated Feb. 27, 2018, for corresponding International Application No. PCT/JP2018/000329, with an English translation.

Extended European Search Report for corresponding European Application No. 18739380.6, dated Nov. 25, 2019.

Korean Office Action dated Jul. 20, 2020 for corresponding Application No. 10-2019-7019843 with an English translation.

Chinese Office Action and Search Report dated May 20, 2020, for corresponding Chinese Patent Application No. 201880006437.2, with an English translation.

* cited by examiner

ROTARY JOINT AND CENTRIFUGAL SEPARATOR

CROSS REFERENCE TO RELATED APPLICATION

This is a continuation of International Application No. PCT/JP2018/000329 filed on Jan. 10, 2018, and claims priority from Japanese Patent Application No. 2017-002147 filed on Jan. 10, 2017, the entire disclosure of which is incorporated herein by reference.

BACKGROUND OF THE INVENTION

1. Field of the Invention

The present invention relates to a rotary joint for supplying and discharging a liquid to and from a container which is revolved around a rotation axis, and a centrifugal separator.

2. Description of the Related Art

In a centrifugal separator, a liquid is supplied to and discharged from a centrifugal separation container, which is revolved around a rotation axis, through a rotary joint disposed on the rotation axis. The rotary joint comprises a shaft body and a tube body into which the shaft body is inserted such that the tube body is rotatable relative to the shaft body, in which the shaft body is provided with a flow path extending in an axial direction in the interior of the shaft body, the tube body is provided with a flow path which penetrates the tube body from the inner peripheral surface to the outer peripheral surface of the tube body, and an annular flow path is provided between the outer peripheral surface of the shaft body and the inner peripheral surface of the tube body. The flow path of the shaft body and the flow path of the tube body are maintained in a state of communicating with each other through the annular flow path between the shaft body and the tube body, regardless of the relative rotation between the shaft body and the tube body.

In this type of rotary joint, typically, the tube body is immovably installed, for example, by being fixed to a stand of a centrifugal separator and the shaft body is revolved integrally with the container (refer to, for example, JP2012-096154A). However, on the contrary, there is also a case where the shaft body is immovably installed and the tube body is rotated integrally with the container (refer to, for example, JP2011-106593A).

SUMMARY OF THE INVENTION

The flow path of the shaft body of the rotary joint extends in the axial direction in the interior of the shaft body, and in a case where the shaft body is rotated, a centrifugal force due to the rotation of the shaft body acts on the liquid flowing through the flow path of the shaft body, and thus there is a concern that dispersoids contained in the liquid may stay in the flow path of the shaft body.

On the other hand, in a case where the tube body is rotated, the retention of the dispersoids in the flow path of the shaft body is alleviated. Further, the flow path of the tube body extends to penetrate the tube body from the inner peripheral surface to the outer peripheral surface of the tube body, that is, extends in a direction of action of the centrifugal force, and therefore, the retention of the dispersoids in the flow path of the tube body can also be suppressed.

However, the peripheral velocity of the tube body is larger than the peripheral velocity of the shaft body, and there is a concern that relatively large shear may act on the liquid which flows from the annular flow path between the shaft body and the tube body into the flow path of the tube body or flows from the flow path of the tube body into the annular flow path between the shaft body and the tube body. For this reason, damage to the dispersoids contained in the liquid is concerned.

The present invention has been made in view of the above circumstances and has an object to provide a rotary joint and a centrifugal separator, in which it is possible to suppress the retention of and damage to dispersoids contained in a liquid.

A rotary joint according to an aspect of the present invention is a rotary joint which supplies and discharges a liquid to and from a container which is revolved around a rotation axis, the rotary joint comprising: a shaft body which is immovably installed; a tube body into which the shaft body is inserted and which is rotated around the shaft body together with the container; a shaft-side supply flow path which is provided in an interior of the shaft body and has an opening provided on an outer peripheral surface of the shaft body; a shaft-side discharge flow path which is provided in the interior of the shaft body and has an opening provided at a different position separated in an axial direction of the shaft body from the opening of the shaft-side supply flow path on the outer peripheral surface of the shaft body; a tube-side supply flow path which is provided to penetrate the tube body from an inner peripheral surface to an outer peripheral surface of the tube body and disposed at a position overlapping the opening of the shaft-side supply flow path in the axial direction of the shaft body; a tube-side discharge flow path which is provided to penetrate the tube body from the inner peripheral surface to the outer peripheral surface of the tube body and disposed at a position overlapping the opening of the shaft-side discharge flow path in the axial direction of the shaft body; a supply communication flow path which is provided in an annular shape around the shaft body between the outer peripheral surface of the shaft body and the inner peripheral surface of the tube body and makes the shaft-side supply flow path and the tube-side supply flow path communicate with each other; and a discharge communication flow path which is provided in an annular shape around the shaft body between the outer peripheral surface of the shaft body and the inner peripheral surface of the tube body and makes the shaft-side discharge flow path and the tube-side discharge flow path communicate with each other, in which the tube-side supply flow path is inclined in a direction opposite to a rotation direction of the tube body with respect to a radial direction which extends to pass through a connection portion between the tube-side supply flow path and the supply communication flow path from the shaft body, and the tube-side discharge flow path is inclined in the same direction as the rotation direction of the tube body with respect to a radial direction which extends to pass through a connection portion between the tube-side discharge flow path and the discharge communication flow path from the shaft body.

A centrifugal separator according to an aspect of the present invention comprising: the rotary joint; a liquid-to-be-treated supply/discharge part which is connected to the shaft-side supply flow path and the shaft-side discharge flow path of the rotary joint; a centrifugal separation container which is connected to the tube-side supply flow path and the tube-side discharge flow path of the rotary joint; and a drive part which holds the tube body of the rotary joint and the centrifugal separation container, rotates the tube body around the shaft body of the rotary joint, and revolves the centrifugal separation container around the shaft body, in which the liquid-to-be-treated supply/discharge part supplies and discharges a liquid to be treated to and from the centrifugal separation container through the rotary joint.

According to the present invention, it is possible to provide a rotary joint and a centrifugal separator, in which it is possible to suppress the retention of and damage to dispersoids contained in a liquid.

DESCRIPTION OF THE PREFERRED EMBODIMENTS

Figure 1:
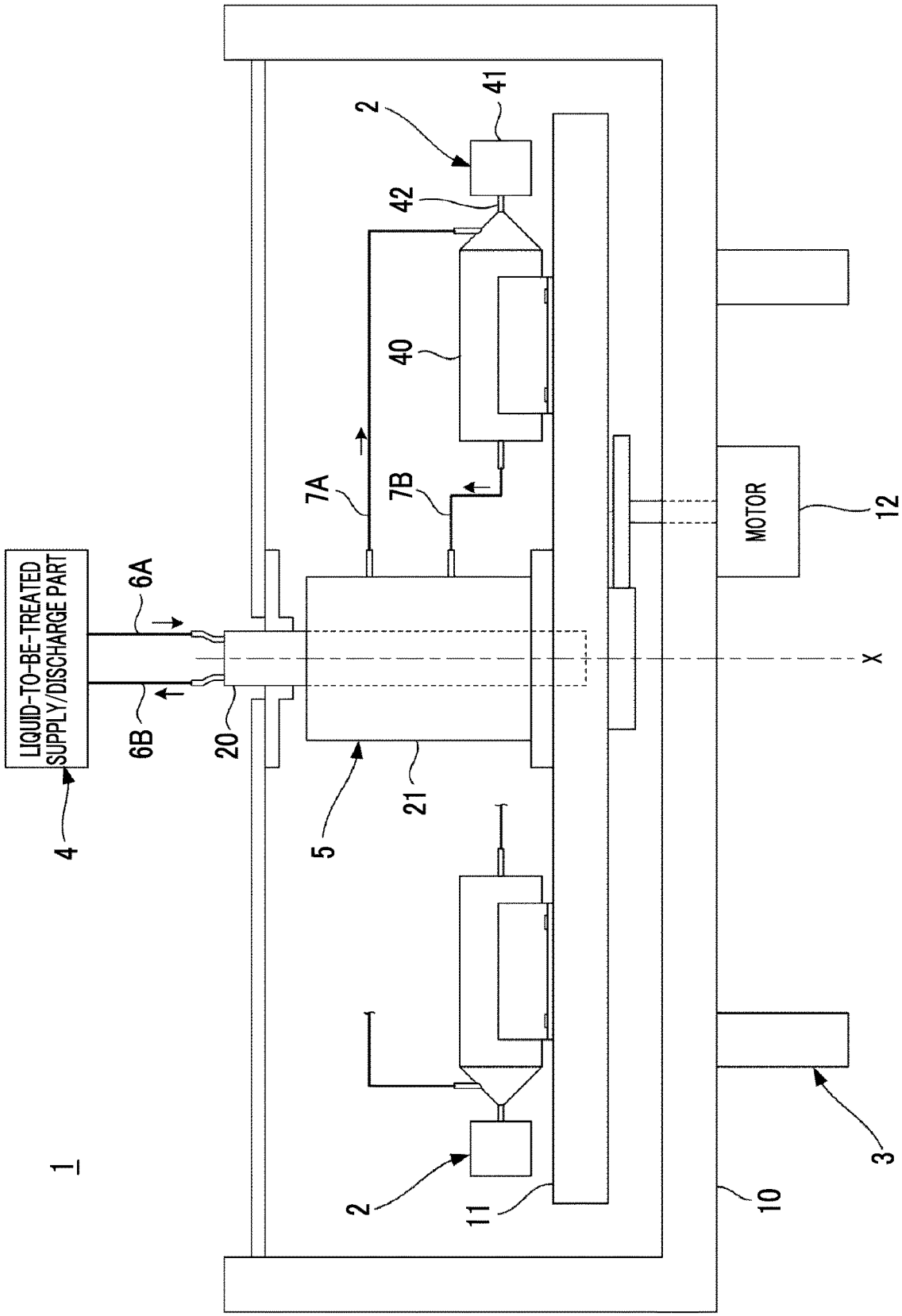
FIG. 1 is a schematic diagram of an example of a centrifugal separator, for describing an embodiment of the present invention.

FIG. 1 shows an example of a centrifugal separator, for describing an embodiment of the present invention.

A centrifugal separator 1 comprises a centrifugal separation container 2, a drive part 3 which revolves the centrifugal separation container 2 around a rotation axis X, a liquid-to-be-treated supply/discharge part 4 which supplies and discharges a liquid to be treated to and from the centrifugal separation container 2 which is revolved, and a rotary joint 5.

The drive part 3 has a stand 10, a rotary table 11 supported by the stand 10 so as to be rotatable around the rotation axis X, and a motor 12 which rotates the rotary table 11. The centrifugal separation container 2 is installed at a location separated from the rotation axis X on the rotary table 11, and the rotary table 11 is rotated by the motor 12, whereby the centrifugal separation container 2 is revolved around the rotation axis X. The number of centrifugal separation containers 2 which are installed and the installation location of the centrifugal separation container 2 are not particularly limited. However, typically, as in the illustrated example, a plurality of centrifugal separation containers 2 (in the illustrated example, two centrifugal separation containers 2) are installed at equal intervals in a circumferential direction centered on the rotation axis X.

The liquid-to-be-treated supply/discharge part 4 and the rotary joint 5 are connected to each other by a liquid sending pipe 6A and a liquid sending pipe 6B, and the rotary joint 5 and each of the centrifugal separation containers 2 are connected each other by a liquid sending pipe 7A and a liquid sending pipe 7B. The liquid to be treated which contains dispersoids is supplied from the liquid-to-be-treated supply/discharge part 4 to the centrifugal separation container 2 through the rotary joint 5. The dispersoids contained in the liquid to be treated supplied to the centrifugal separation container 2 are separated under the action of a centrifugal force caused by the revolution of the centrifugal separation container 2. Then, in this example, the residual liquid-to-be-treated, from which the dispersoids have been removed, is discharged from the centrifugal separation container 2 to the liquid-to-be-treated supply/discharge part 4 through the rotary joint 5.

Figure 2:
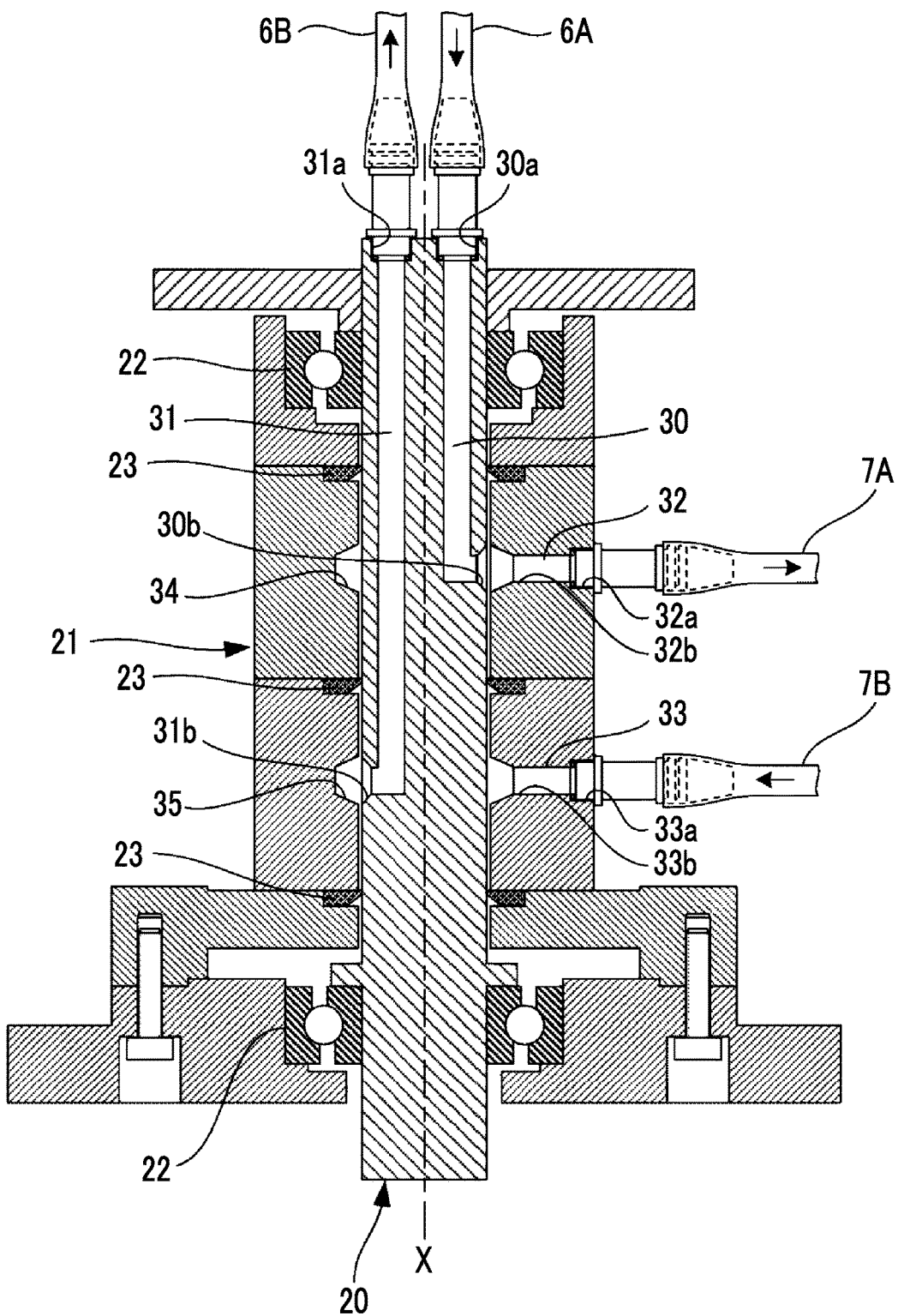
FIG. 2 is a schematic diagram of a longitudinal section of an example of a rotary joint, for describing an embodiment of the present invention.

FIG. 2 shows the configuration of the rotary joint 5.

The rotary joint 5 comprises a shaft body 20 which is disposed on the rotation axis X and a tube body 21 into which the shaft body 20 is inserted such that the tube body 21 is rotatable relative to the shaft body 20. The shaft body 20 is immovably installed by being fixed to the stand 10 (refer to FIG. 1). On the other hand, the tube body 21 is fixed to the rotary table 11 (refer to FIG. 1) and rotated integrally with the centrifugal separation container 2 installed on the rotary table 11.

A plurality of bearings 22 are disposed at different positions in the axial direction between the shaft body 20 which is immovably installed and the tube body 21 which is rotated, and the tube body 21 is rotatably supported by the bearings 22. In the illustrated example, two bearings 22 are disposed between an upper end portion of the tube body 21 and the shaft body 20 and between a lower end portion of the tube body 21 and the shaft body 20. However, the number of bearings 22 which are disposed and the disposition location of the bearing 22 are not particularly limited. The bearing 22 may be a rolling bearing or may be a sliding bearing, and in a case where the bearing 22 is a sliding bearing, it may be a lubricating type bearing which requires oil or grease, or may be an oil-free type bearing. However, preferably, the bearing 22 is an oil-free type bearing. According to the liquid to be treated which flows through the rotary joint 5, there is a case where autoclaving (high-pressure steam sterilization treatment) may be applied to the rotary joint 5, and in a case of being the oil-free type bearing, leakage of oil or grease in a case of being exposed to a high temperature is eliminated, and thus the autoclaving becomes possible.

The shaft body 20 is provided with a shaft-side supply flow path 30 and a shaft-side discharge flow path 31 which extend in the axial direction in the interior of the shaft body 20. An opening 30a on one end side of the shaft-side supply flow path 30 is formed on the outer surface of the shaft body 20, which is exposed to the outside of the tube body 21, and an opening 30b on the other end side is formed on the outer peripheral surface of the shaft body 20, which is located between the two bearings 22. An opening 31a on one end side of the shaft-side discharge flow path 31 is formed on the upper end surface of the shaft body 20, and an opening 31b on the other end side is formed on the outer peripheral surface of the shaft body 20, which is located between the two bearings 22, and is formed at a different position separated from the opening 30b of the shaft-side supply flow path 30 in the axial direction on the outer peripheral surface of the shaft body 20. The liquid sending pipe 6A leading to the liquid-to-be-treated supply/discharge part 4 is connected to the opening 30a of the shaft-side supply flow path 30, which is formed on the upper end surface of the shaft body 20, and the liquid sending pipe 6B leading to the liquid-to-be-treated supply/discharge part 4 is connected to the opening 31a of the shaft-side discharge flow path 31.

The tube body 21 is provided with a tube-side supply flow path 32 and a tube-side discharge flow path 33 which penetrate the tube body 21 from the inner peripheral surface to the outer peripheral surface of the tube body 21. The tube-side supply flow path 32 is disposed at a position overlapping the opening 30b of the shaft-side supply flow path 30 in the axial direction, and the tube-side discharge flow path 33 is disposed at a position overlapping the opening 31b of the shaft-side discharge flow path 31 in the axial direction. The liquid sending pipe 7A leading to the centrifugal separation container 2 is connected to an opening 32a of the tube-side supply flow path 32, which is formed on the outer peripheral surface of the tube body 21, and the liquid sending pipe 7B leading to the centrifugal separation container 2 is connected to an opening 33a of the tube-side discharge flow path 33.

A supply communication flow path 34 is provided between the outer peripheral surface of the shaft body 20 and the inner peripheral surface of the tube body 21 at a position overlapping the opening 30b of the shaft-side supply flow path 30 and the tube-side supply flow path 32 in the axial direction. The supply communication flow path 34 is provided in an annular shape around the shaft body 20, and the shaft-side supply flow path 30 and the tube-side supply flow path 32 are maintained in a state of communicating with each other through the supply communication flow path 34, regardless of the rotation of the tube body 21.

Further, a discharge communication flow path 35 is provided between the outer peripheral surface of the shaft body 20 and the inner peripheral surface of the tube body 21 at a position overlapping the opening 31b of the shaft-side discharge flow path 31 and the tube-side discharge flow path 33 in the axial direction. The discharge communication flow path 35 is provided in an annular shape around the shaft body 20, and the shaft-side discharge flow path 31 and the tube-side discharge flow path 33 are maintained in a state of communicating with each other through the discharge communication flow path 35, regardless of the rotation of the tube body 21.

Each of the supply communication flow path 34 and the discharge communication flow path 35 is formed by an annular concave portion provided on the inner peripheral surface of the tube body 21.

A plurality of seal members 23 are provided between the shaft body 20 and the tube body 21, and the supply communication flow path 34 and the discharge communication flow path 35 provided between the shaft body 20 and the tube body 21, and the two bearings 22 are isolated from each other by the seal members 23. The seal member 23 may be a so-called mechanical seal having, for example, a configuration in which a sliding contact ring is fixed to each of the shaft body 20 and the tube body 21 and the two sliding contact rings are brought into sliding contact with each other, or may be a so-called lip seal in which an annular lip made of an elastomer or the like is brought into sliding contact with the outer peripheral surface of the shaft body 20. The seal members 23 can be appropriately selected according to the conditions, required specifications, dimensions, or the like of the rotary joint 5.

The liquid to be treated which is supplied from the liquid-to-be-treated supply/discharge part 4 (refer to FIG. 1) first flows into the shaft-side supply flow path 30 through the opening 30a of the shaft-side supply flow path 30, and then flows into the tube-side supply flow path 32 via the supply communication flow path 34, and is sent out from the tube-side supply flow path 32 to the centrifugal separation container 2. Further, the liquid to be treated discharged from the centrifugal separation container 2 first flows into the tube-side discharge flow path 33 through the opening 33a of the tube-side discharge flow path 33, and then flows into the shaft-side discharge flow path 31 via the discharge communication flow path 35, and is sent out from the shaft-side discharge flow path 31 to the liquid-to-be-treated supply/discharge part 4. The tube body 21 is rotated integrally with the centrifugal separation container 2 in a certain direction while the liquid to be treated is being supplied to and discharged from the centrifugal separation container 2 through the rotary joint 5.

The tube body 21 is rotated and the shaft body 20 is immovably installed, whereby a centrifugal force does not act on the liquid to be treated which flows through the shaft-side supply flow path 30 and the shaft-side discharge flow path 31 of the shaft body 20, and thus the retention of the dispersoids contained in the liquid to be treated in the shaft-side supply flow path 30 is suppressed. In this example, the liquid to be treated which flows through the shaft-side discharge flow path 31 is the residual liquid-to-be-treated from which the dispersoids have been removed by the centrifugal separation container 2. However, for example, in a case where a dispersion liquid in which the separated dispersoids are dispersed flows through the shaft-side discharge flow path 31, similar to the shaft-side supply flow path 30, the retention of the dispersoids contained in the liquid to be treated in the shaft-side discharge flow path 31 is also suppressed. On the other hand, the tube-side supply flow path 32 and the tube-side discharge flow path 33 of the tube body 21 which is rotated extend to penetrate the tube body 21 from the inner peripheral surface to the outer peripheral surface of the tube body 21, that is, extend in the direction of action of the centrifugal force, and therefore, the retention of the dispersoids in the tube-side supply flow path 32 and the tube-side discharge flow path 33 is also suppressed.

Further, the centrifugal force does not act on the liquid to be treated which flows through the shaft-side supply flow path 30 and the shaft-side discharge flow path 31 of the shaft body 20, and therefore, a load acting on the shaft body 20 is reduced, so that a reduction in the diameter of the shaft body 20 becomes possible. Then, in a case where the seal member 23 is a lip seal, due to a reduction in the diameter of the shaft body 20, the relative peripheral velocity of the lip which is in sliding contact with the outer peripheral surface of the shaft body 20 is reduced, and thus it is possible to cope with higher speed rotation.

Figure 3:
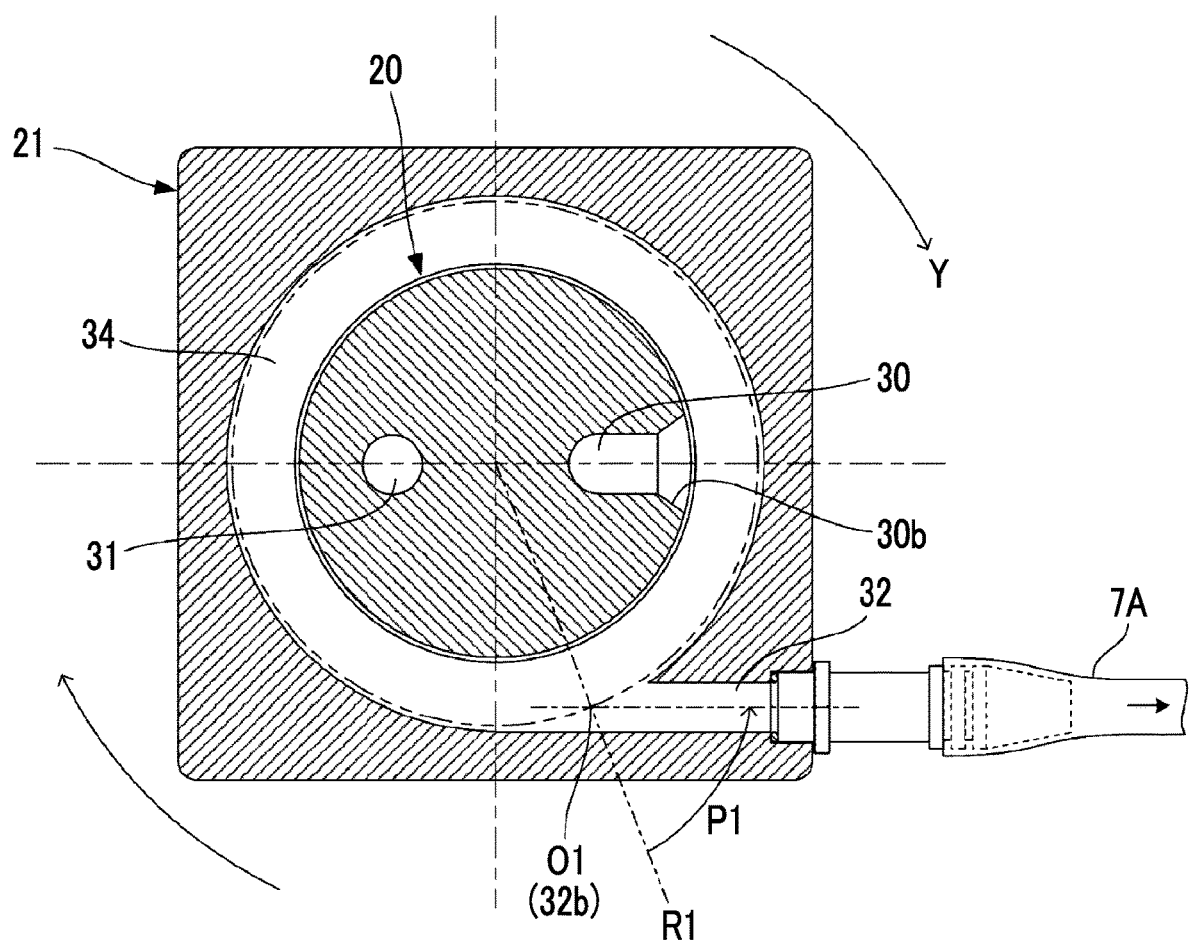
FIG. 3 is a schematic diagram of a transverse section including a shaft-side supply flow path, a tube-side supply flow path, and a supply communication flow path of the rotary joint of FIG. 2.

FIG. 3 shows the configurations of the shaft-side supply flow path 30, the tube-side supply flow path 32, and the supply communication flow path 34.

The tube-side supply flow path 32 for sending out the liquid to be treated toward the centrifugal separation container 2 is inclined in a P1 direction opposite to a rotation direction Y of the tube body 21, with respect to a radial direction R1 which is a radial direction from the center of the shaft body 20 and is a radial direction passing through the center of a connection portion between the tube-side supply flow path 32 and the supply communication flow path 34, that is, a center O1 of an opening 32b of the tube-side supply flow path 32, which is formed on the inner peripheral surface of the tube body 21.

Figure 4:
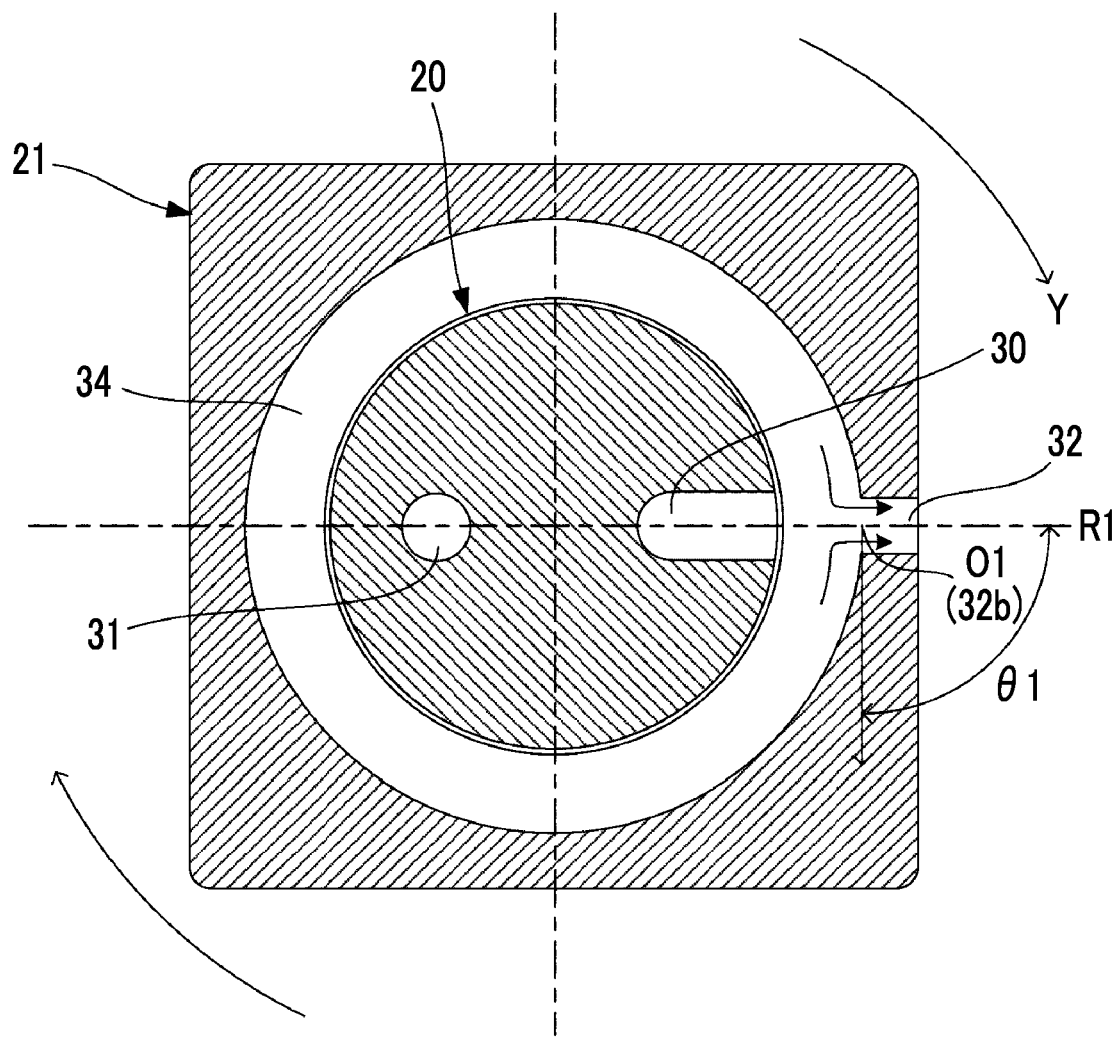
FIG. 4 is a schematic diagram showing the behavior of a liquid to be treated which flows from the supply communication flow path of the rotary joint into a tube-side supply flow path extending in a radial direction from a rotation axis.
Figure 5:
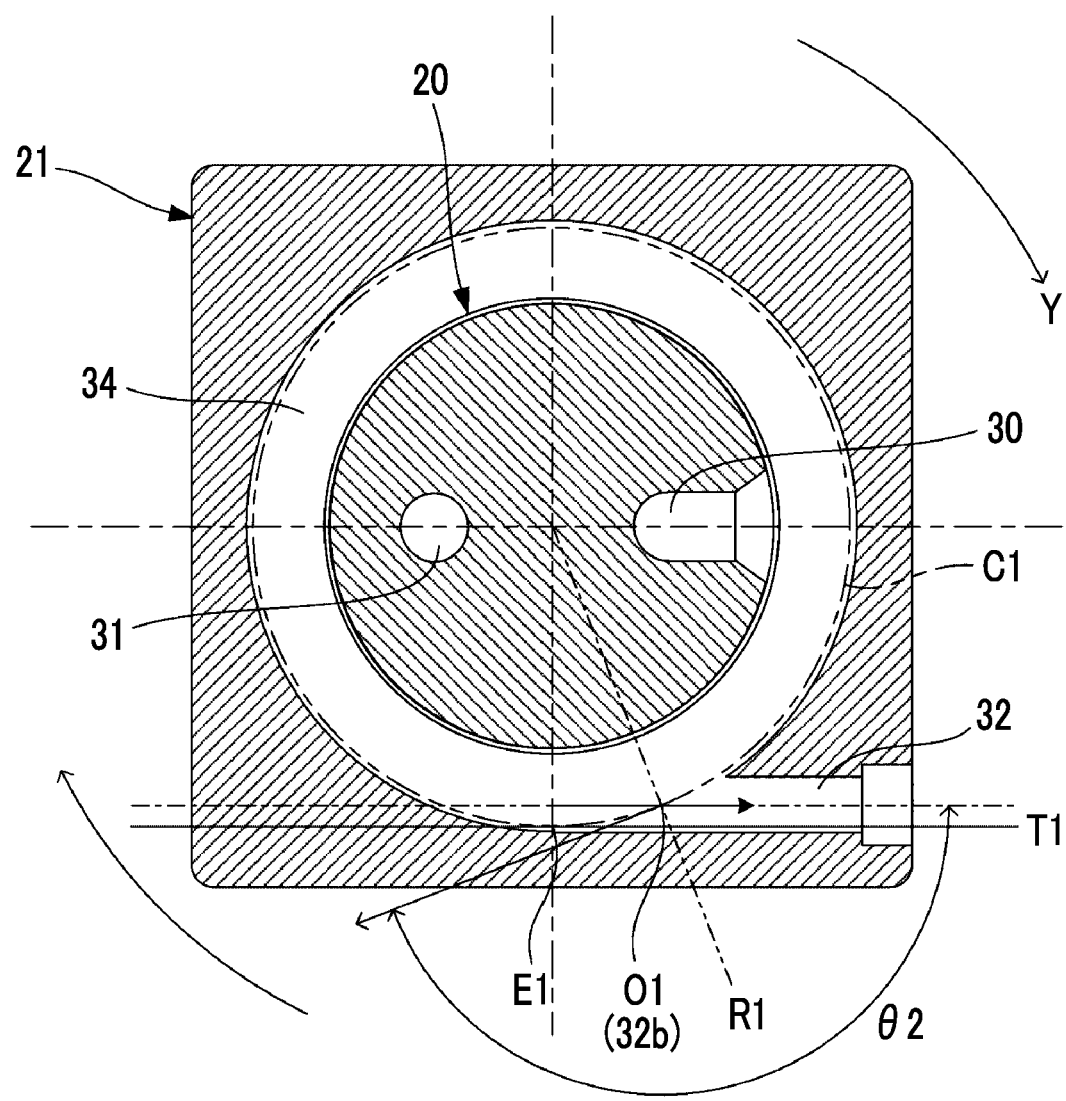
FIG. 5 is a schematic diagram showing the behavior of the liquid to be treated which flows from the supply communication flow path of the rotary joint into a tube-side supply flow path inclined with respect to the radial direction from the rotation axis.

FIGS. 4 and 5 schematically show the behavior of the liquid to be treated which flows from the supply communication flow path 34 into the tube-side supply flow path 32, and in particular, FIG. 4 shows the behavior of the liquid to be treated in a case where it is assumed that the tube-side supply flow path 32 extends in the radial direction R1, and FIG. 5 shows the behavior of the liquid to be treated in a case where the tube-side supply flow path 32 is inclined in the direction opposite to the rotation direction Y of the tube body 21 with respect to the radial direction R1.

As shown in FIG. 4, in a case where it is assumed that the tube-side supply flow path 32 extends in the radial direction R1, an angle θ1 between a moving direction of the opening 32b of the tube-side supply flow path 32 which is moved according to the rotation of the tube body 21 and a flowing direction of the liquid to be treated which flows from the supply communication flow path 34 into the tube-side supply flow path 32 through the opening 32b becomes about 90°. For this reason, relatively strong shear acts on the liquid to be treated in the vicinity of the opening 32b.

On the other hand, as shown in FIG. 5, in a case where the tube-side supply flow path 32 is inclined in the direction opposite to the rotation direction Y of the tube body 21 with respect to the radial direction R1, an angle θ2 between the moving direction of the opening 32b of the tube-side supply flow path 32 which is moved according to the rotation of the tube body 21 and the flowing direction of the liquid to be treated which flows from the supply communication flow path 34 into the tube-side supply flow path 32 through the opening 32b becomes larger than 90°. In other words, the moving direction of the opening 32b and the flowing direction of the liquid to be treated become closer to parallel than in the case shown in FIG. 4. Further, the inclination of the tube-side supply flow path 32 with respect to the radial direction R1 is in the direction opposite to the rotation direction Y of the tube body 21, whereby the liquid to be treated smoothly flows into the tube-side supply flow path 32 according to the rotation of the tube body 21. In this way, the shear acting on the liquid to be treated in the vicinity of the opening 32b is alleviated, and thus the damage to the dispersoids contained in the liquid to be treated is suppressed.

In a case where one end which is located on the side opposite to the shaft body 20 side across the central axis of the tube-side supply flow path 32, out of both ends of the opening 32b (the connection portion between the tube-side supply flow path 32 and the supply communication flow path 34) appearing in the cross section perpendicular to the shaft body 20, is defined as an outer end E1, from the viewpoint of suppressing the shear acting on the liquid to be treated, it is preferable that the tube-side supply flow path 32 extends along a tangent line T1 at the outer end E1 of a circle C1 passing through the outer end E1 around the shaft body 20.

The liquid to be treated flows from the shaft-side supply flow path 30 into the supply communication flow path 34 through the opening 30b, and the opening 30b is preferably formed in a tapered shape having a cross-sectional area which gradually increases toward the supply communication flow path 34 side, as shown in FIGS. 2 and 3. In this way, the liquid to be treated smoothly flows from the shaft-side supply flow path 30 into the annular supply communication flow path 34.

Figure 6:
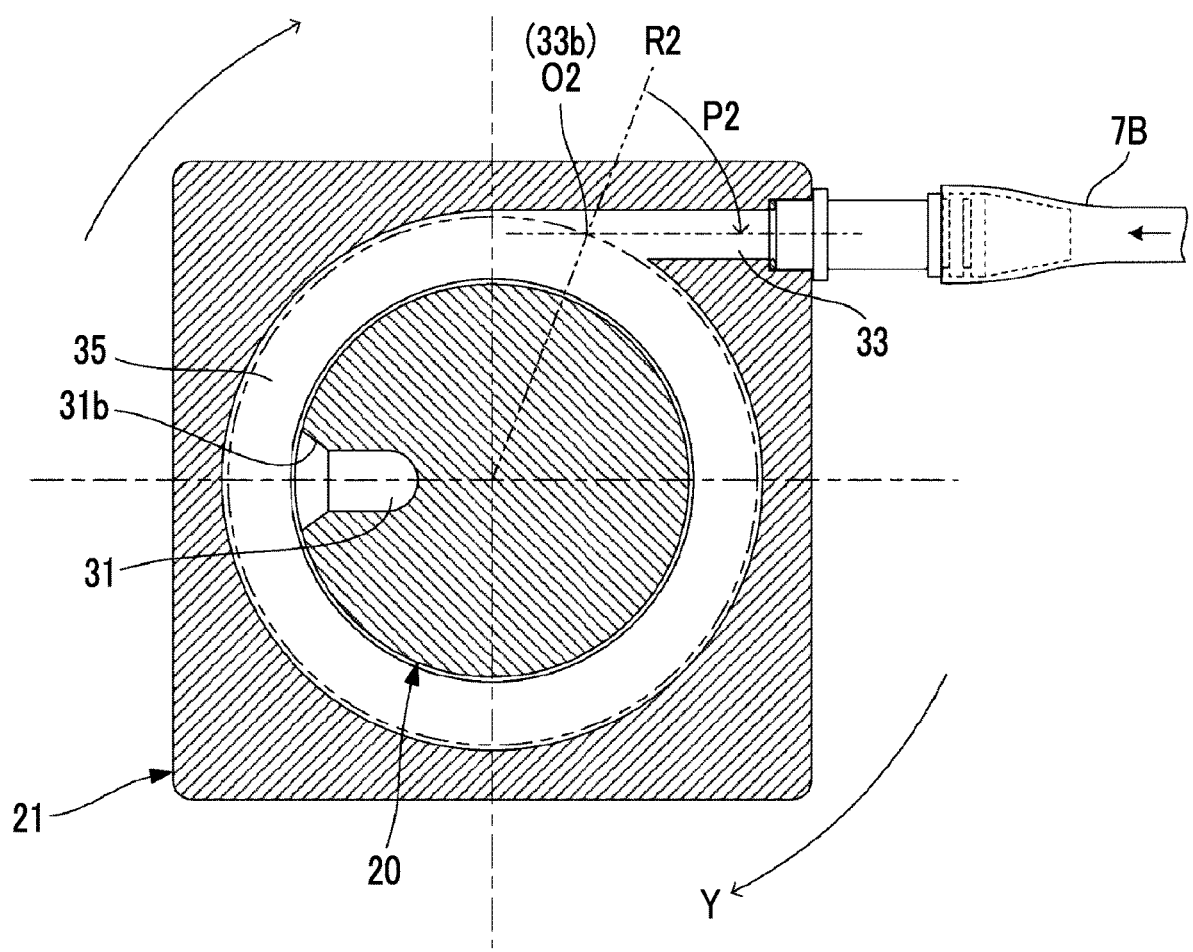
FIG. 6 is a schematic diagram of a transverse section including a shaft-side discharge flow path, a tube-side discharge flow path, and a discharge communication flow path of the rotary joint of FIG. 2.

FIG. 6 shows the configurations of the shaft-side discharge flow path 31, the tube-side discharge flow path 33, and the discharge communication flow path 35.

The tube-side discharge flow path 33 into which the liquid to be treated discharged from the centrifugal separation container 2 flows is inclined in a P2 direction which is the same as the rotation direction Y of the tube body 21, with respect to a radial direction R2 which is a radial direction from the center of the shaft body 20 and is a radial direction passing through the center of a connection portion between the tube-side discharge flow path 33 and the discharge communication flow path 35, that is, a center O2 of an opening 33b of the tube-side discharge flow path 33, which is formed on the inner peripheral surface of the tube body 21.

Figure 7:
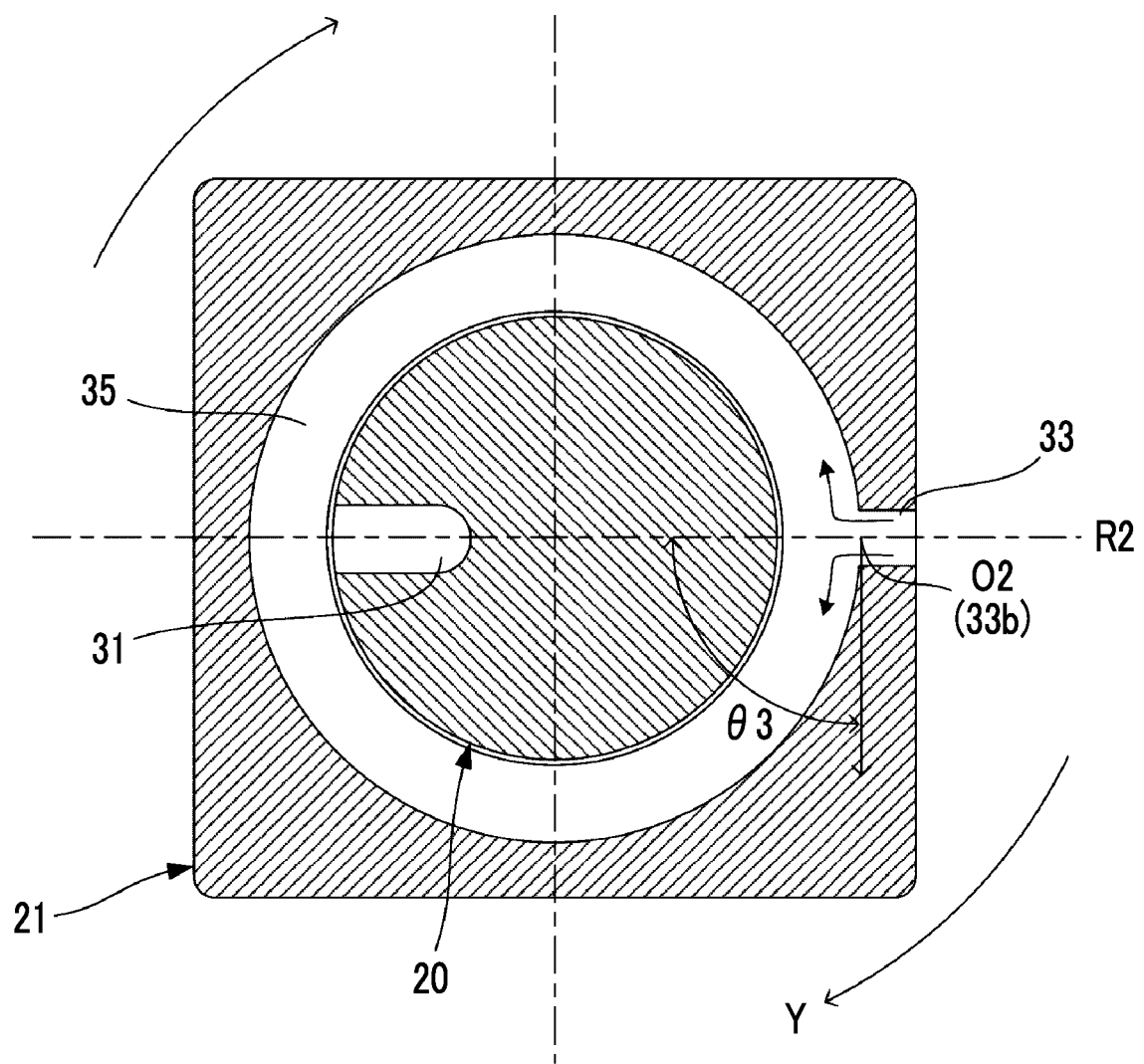
FIG. 7 is a schematic diagram showing the behavior of the liquid to be treated which flows from a tube-side discharge flow path extending in the radial direction from the rotation axis of the rotary joint into the discharge communication flow path.
Figure 8:
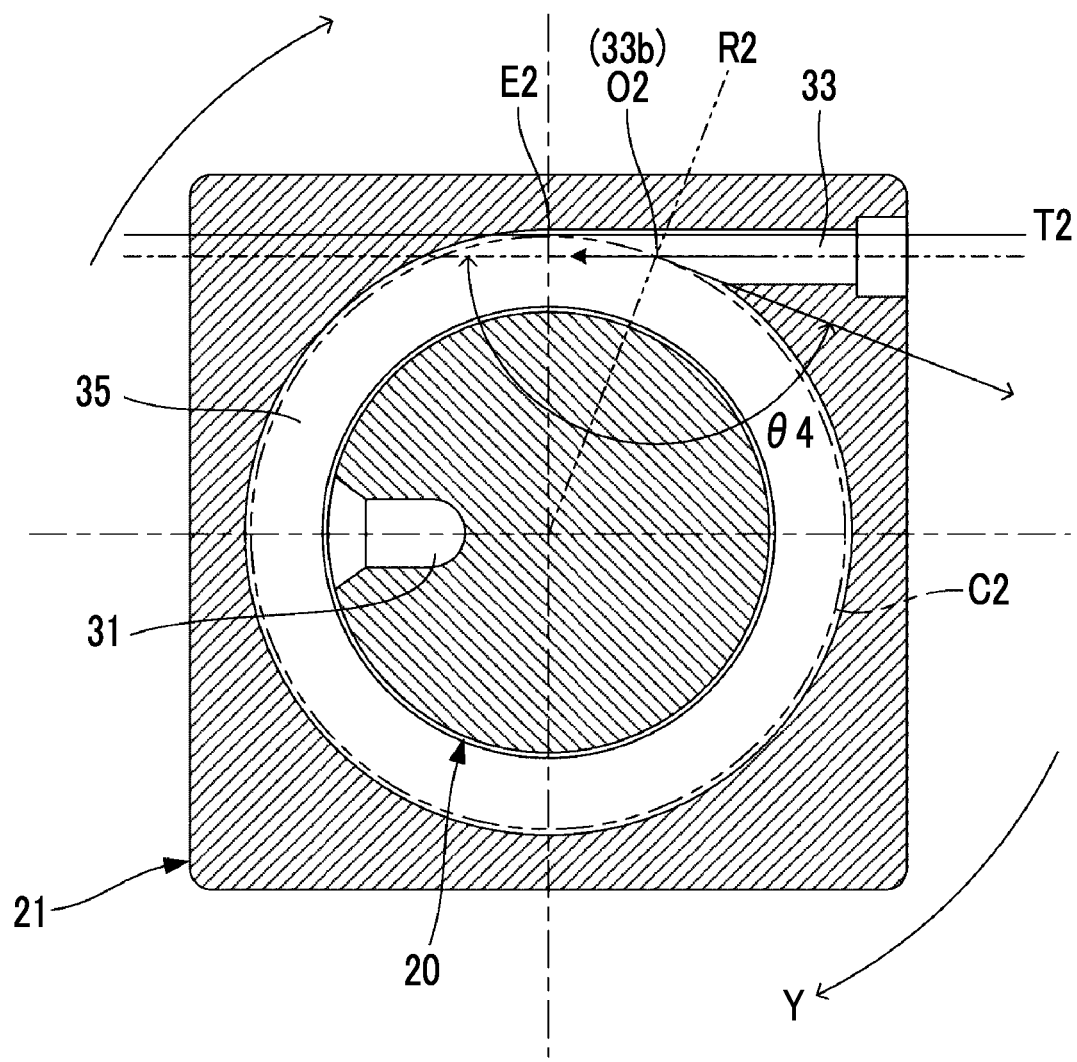
FIG. 8 is a schematic diagram showing the behavior of the liquid to be treated which flows from a tube-side discharge flow path inclined with respect to the radial direction from the rotation axis of the rotary joint into the discharge communication flow path.

FIGS. 7 and 8 schematically show the behavior of the liquid to be treated which flows from the tube-side discharge flow path 33 into the discharge communication flow path 35, and in particular, FIG. 7 shows the behavior of the liquid to be treated in a case where it is assumed that the tube-side discharge flow path 33 extends in the radial direction R2, and FIG. 8 shows the behavior of the liquid to be treated in a case where the tube-side discharge flow path 33 is inclined in the rotation direction Y of the tube body 21 with respect to the radial direction R2.

As shown in FIG. 7, in a case where it is assumed that the tube-side discharge flow path 33 extends in the radial direction R2, an angle θ3 between a moving direction of the opening 33b of the tube-side discharge flow path 33 which is moved according to the rotation of the tube body 21 and a flowing direction of the liquid to be treated which flows from the tube-side discharge flow path 33 into the discharge communication flow path 35 through the opening 33b becomes about 90°. For this reason, relatively strong shear acts on the liquid to be treated in the vicinity of the opening 33b. Then, the liquid to be treated which flows into the discharge communication flow path 35 collides with a site facing the opening 33b in the outer peripheral surface of the shaft body 20 from the front.

On the other hand, as shown in FIG. 8, in a case where the tube-side discharge flow path 33 is inclined in the rotation direction Y of the tube body 21 with respect to the radial direction R2, an angle θ4 between the moving direction of the opening 33b of the tube-side discharge flow path 33 which is moved according to the rotation of the tube body 21 and the flowing direction of the liquid to be treated which flows from the tube-side discharge flow path 33 into the discharge communication flow path 35 through the opening 33b becomes larger than 90°. In other words, the moving direction of the opening 33b and the flowing direction of the liquid to be treated become closer to parallel than in the case shown in FIG. 7. Further, the inclination of the tube-side discharge flow path 33 with respect to the radial direction R2 is in the rotation direction Y of the tube body 21, whereby the liquid to be treated is smoothly sent out from the tube-side discharge flow path 33 according to the rotation of the tube body 21. In this way, the shear acting on the liquid to be treated in the vicinity of the opening 33b is relieved, and the collision of the liquid to be treated which flows into the discharge communication flow path 35 with the outer peripheral surface of the shaft body 20 is also relieved. In this example, the liquid to be treated which flows through the tube-side discharge flow path 33 is the residual liquid-to-be-treated from which the dispersoids have been removed by the centrifugal separation container 2. However, for example, in a case where a dispersion liquid in which the separated dispersoids are dispersed flows through the tube-side discharge flow path 33, the damage to the dispersoids contained in the dispersion liquid is suppressed.

In a case where one end which is located on the side opposite to the shaft body 20 side across the central axis of the tube-side discharge flow path 33, out of both ends of the opening 33b (the connection portion between the tube-side discharge flow path 33 and the discharge communication flow path 35) appearing in the cross section perpendicular to the shaft body 20, is defined as an outer end E2, from the viewpoint of suppressing the shear acting on the liquid to be treated, it is preferable that the tube-side discharge flow path 33 extends along a tangent line T2 at the outer end E2 of a circle C2 passing through the outer end E2 around the shaft body 20.

The liquid to be treated flows from the discharge communication flow path 35 into the shaft-side discharge flow path 31 through the opening 31b, and the opening 31b is preferably formed in a tapered shape having a cross-sectional area which gradually increases toward the discharge communication flow path 35, as shown in FIGS. 2 and 6. In this way, the liquid to be treated smoothly flows from the annular discharge communication flow path 35 into the shaft-side discharge flow path 31.

Figure 9:
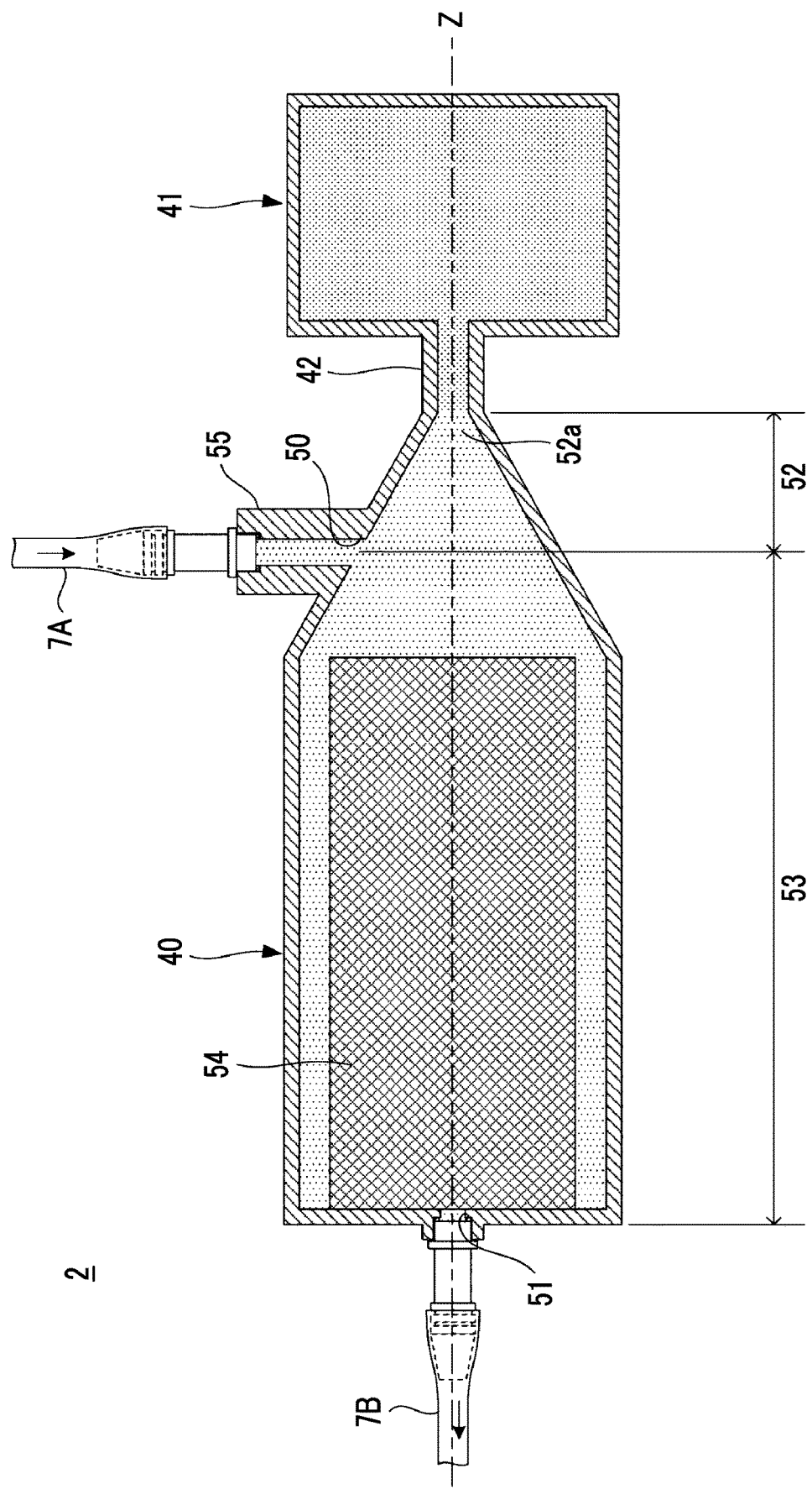
FIG. 9 is a schematic diagram of a longitudinal section of an example of a centrifugal separation container, for describing an embodiment of the present invention.

Next, the centrifugal separation container 2 will be described. FIG. 9 shows the configuration of the centrifugal separation container 2.

The centrifugal separation container 2 comprises a separation part 40 for separating the dispersoids contained in the liquid to be treated which is supplied to the centrifugal separation container 2, a recovery part 41 for recovering the separated dispersoids, and a communication path 42 which makes the separation part 40 and the recovery part 41 communicate with each other.

In the illustrated example, the separation part 40 is formed in a cylindrical shape, and the centrifugal separation container 2 is installed on the rotary table 11 (refer to FIG. 1) in a state where a central axis Z of the separation part 40 is substantially orthogonal to the rotation axis X. The shape of the separation part 40 is not limited to a cylindrical shape and may be, for example, a square tubular shape. Further, the installation state of the centrifugal separation container 2 is not limited to the state where the central axis Z of the separation part 40 is substantially orthogonal to the rotation axis X. For example, the centrifugal separation container 2 may be installed on the rotary table 11 in a state of being inclined in the axial direction of the rotation axis X with respect to a state where the central axis Z of the separation part 40 is substantially orthogonal to the rotation axis X. Further, the centrifugal separation container 2 may be installed on the rotary table 11 in a state where the central axis Z of the separation part 40 does not cross the rotation axis X and is offset with respect to the rotation axis X. The central axis Z of the separation part 40 is offset with respect to the rotation axis X, whereby the separation part 40 can be extended to avoid the rotary joint 5 which is disposed on the rotation axis X, without increasing the size of the centrifugal separator 1. Further, it also becomes easy to arrange the liquid sending pipe 7A and the liquid sending pipe 7B connecting the centrifugal separation container 2 and the rotary joint 5.

The separation part 40 is provided with a liquid-to-be-treated supply port 50 and a liquid-to-be-treated discharge port 51. The liquid sending pipe 7A leading to the tube-side supply flow path 32 (refer to FIG. 2) of the rotary joint 5 is connected to the liquid-to-be-treated supply port 50, and on the other hand, the liquid sending pipe 7B leading to the tube-side discharge flow path 33 (refer to FIG. 2) of the rotary joint 5 is connected to the liquid-to-be-treated discharge port 51.

The liquid-to-be-treated supply port 50 is formed in the peripheral wall of the cylindrical separation part 40, and the separation part 40 is provided with a distal region 52 which is disposed on the distal side from the liquid-to-be-treated supply port 50 and a proximal region 53 which is adjacent to the distal region 52 in the axial direction of the separation part 40 and is disposed on the proximal side from the liquid-to-be-treated supply port 50, with respect to the rotation axis X. Then, the liquid-to-be-treated discharge port 51 is provided in the proximal region 53.

The liquid to be treated which is supplied to the centrifugal separation container 2 flows into the separation part 40 through the liquid-to-be-treated supply port 50. The centrifugal separation container 2 is revolved around the rotation axis X, whereby the dispersoids contained in the liquid to be treated in the separation part 40 are separated under the action of the centrifugal force caused by the revolution of the centrifugal separation container 2, and the separated dispersoids are settled in the distal region 52 of the separation part 40. On the other hand, the residual liquid-to-be-treated from which the dispersoids have been removed is collected in the proximal region 53 of the separation part 40. The residual liquid-to-be-treated collected in the proximal region 53 is discharged from the separation part 40 through the liquid-to-be-treated discharge port 51 according to the additional inflow of the liquid to be treated into the separation part 40.

In this example, a filter 54 for filtering the residual liquid-to-be-treated which flows into the liquid-to-be-treated discharge port 51 is provided in the separation part 40. For example, in a case where the flow velocity of the residual liquid-to-be-treated which flows into the liquid-to-be-treated discharge port 51 is excessive in a relationship with the settling velocity of the dispersoid, or the like, there is a possibility that the dispersoids may slightly remain in the liquid to be treated. However, the remaining dispersoids are removed from the liquid to be treated by the filter 54. In a case where the settling velocity of the dispersoid and the flow velocity of the liquid to be treated are appropriately adjusted and/or there is no problem even though the dispersoids remain in the liquid to be treated, the filter 54 may be omitted. The settling velocity of the dispersoid can be appropriately adjusted according to, for example, the revolving radius of the centrifugal separation container 2, the revolving angular velocity of the centrifugal separation container 2, the viscosity of the liquid to be treated, or the like.

From the viewpoint of suppressing the clogging of the filter 54, the filter 54 is provided in the proximal region 53 of the separation part 40. The dispersoids which are moved to the proximal region 53 under the action of the centrifugal force are mainly relatively fine particles, and particles which are fine with respect to the mesh of the filter 54 are hard to cause the clogging of the filter 54. Preferably, the flow velocity of the liquid to be treated, the settling velocity of the dispersoid, and the mesh of the filter 54 are appropriately set such that the dispersoid which is moved to the proximal region 53 becomes a particle which is finer than the mesh of the filter 54. In this way, the clogging of the filter 54 is further suppressed. Further, the centrifugal force for causing the dispersoids to settle in the distal region 52 still acts on the dispersoids removed from the liquid to be treated by the filter 54, and the filter 54 is disposed in the proximal region 53, whereby adhesion of the dispersoids removed from the liquid to be treated to the filter 54 is suppressed, and thus the clogging of the filter 54 is suppressed.

The recovery part 41 for recovering the separated dispersoids is disposed on the distal side from the distal region 52 of the separation part 40, in which the dispersoids are settled, and communicates with a distal end portion 52a of the distal region 52 through the communication path 42. Then, the recovery part 41 is filled with a recovery liquid in which the dispersoids can be dispersed. The dispersoids settled in the distal region 52 of the separation part 40 are moved to the recovery part 41 disposed on the distal side from the distal region 52 through the communication path 42 under the action of the centrifugal force, and are dispersed in the recovery liquid in the recovery part 41.

The communication path 42 is configured to permit the flow of the dispersoids under the action of the centrifugal force and be capable of suppressing the flow of the liquid to be treated in the separation part 40 and the recovery liquid in the recovery part 41, and in the cross section perpendicular to a longitudinal direction of the communication path 42, at least the cross-sectional area of the communication path 42 is made smaller than the cross-sectional area of a connection portion between each of the distal region 52 of the separation part 40 and the recovery part 41 and the communication path 42. In a case where the communication path 42 is a circular pipe, the diameter of the communication path 42 is appropriately in a range of 1 mm to 2 mm, for example, although it depends on the particle diameter of the dispersoid, or the like.

From the viewpoint of smoothly moving the dispersoids settled in the distal region 52 of the separation part 40 to the communication path 42, preferably, the distal region 52 of the separation part 40 is formed in a tapered shape having a cross-sectional area which gradually decreases toward the communication path 42.

The recovery liquid is not particularly limited as long as the dispersoids can be dispersed therein, and may be the same liquid as the mother liquor of the liquid to be treated or may be a different liquid from the mother liquor. However, the specific gravity of the recovery liquid is a concentration to the extent that the flow of the recovery liquid is not disturbed by the interaction that is given by the centrifugal force and the specific gravity of the liquid, that is, soaring of the collected dispersoids to the extent of affecting the recovery of the dispersoids does not occur due to a turbulent flow, and it is favorable that the specific gravity of the recovery liquid is appropriately selected according to the rotation speed of the centrifugal separator or the concentration of the liquid to be treated, and it is more preferable that the specific gravity of the recovery liquid is substantially equal to that of the liquid to be treated.

Figure 10:
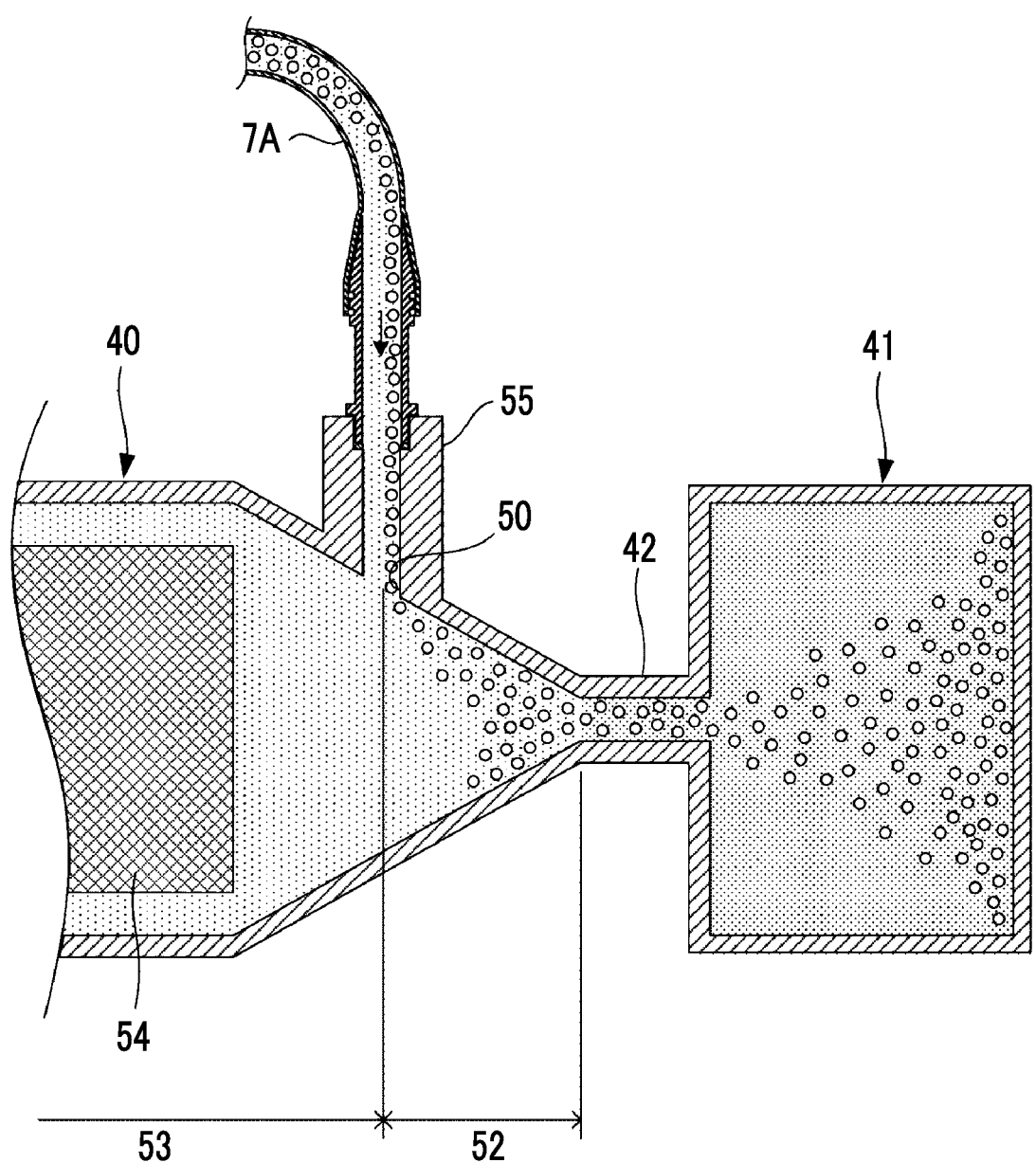
FIG. 10 is a schematic diagram showing the behavior of the liquid to be treated which is treated by the centrifugal separator of FIG. 1.

FIG. 10 shows the behavior of the liquid to be treated which is treated by the centrifugal separator 1.

In the centrifugal separation treatment using the centrifugal separator 1 comprising the centrifugal separation container 2, first, in a state where the recovery part 41 of the centrifugal separation container 2 is filled with the recovery liquid, the liquid to be treated is supplied to the separation part 40 of the centrifugal separation container 2, and thus the separation part 40 is filled with the liquid to be treated. At this time, the centrifugal separation container 2 is installed on the rotary table 11 in a state of being inclined in the axial direction of the rotation axis X with respect to a state where the central axis Z of the separation part 40 is substantially orthogonal to the rotation axis X, whereby air bleeding of the separation part 40 becomes easy. Then, after the separation part 40 is filled with the liquid to be treated, the centrifugal separation container 2 is revolved around the rotation axis X, and thus the centrifugal separation of the dispersoids contained in the liquid to be treated is started. After the centrifugal separation is started, the liquid to be treated is continuously or intermittently supplied to the separation part 40. In a case where the liquid to be treated is supplied to the separation part 40 which is revolved in an empty state, the collision between the dispersoids contained in the liquid to be treated which flows into the empty separation part 40 and the inner peripheral surface of the separation part 40 is not buffered, and thus there is a concern that the dispersoids may be damaged. However, the separation part 40 is filled with the liquid to be treated before the centrifugal separation is started, whereby the dispersoids are protected. Then, in a case where the centrifugal separation is started, the dispersoids contained in the liquid to be treated which is supplied to the separation part 40 are settled in the distal region 52 of the separation part 40.

In this example, the liquid-to-be-treated supply port 50 is formed in the peripheral wall of the cylindrical separation part 40, and a joint portion 55 of the liquid-to-be-treated supply port 50, to which the liquid sending pipe 7A is connected, and at least a connection portion of the liquid sending pipe 7A with the joint portion 55 extend in a direction crossing the radial direction centered on the rotation axis X. For this reason, as shown in FIG. 10, the centrifugal force acts on the liquid to be treated which flows through the joint portion 55 and the connection portion of the liquid sending pipe 7A, and the dispersoids contained in the liquid to be treated are drawn to the distal side of the joint portion 55 and the connection portion of the liquid sending pipe 7A under the action of the centrifugal force, so that the separation of the dispersoids is promoted. From the viewpoint of promoting the separation of the dispersoids at the joint portion 55 and the connection portion of the liquid sending pipe 7A, it is preferable that the liquid-to-be-treated supply port 50 is disposed on the distal side from the center in the direction of the central axis of the separation part 40. In this way, the centrifugal force acting on the liquid to be treated which flows through the joint portion 55 of the liquid-to-be-treated supply port 50 and the connection portion of the liquid sending pipe 7A is strengthened, and thus the separation of the dispersoids is further promoted.

The dispersoids settled in the distal region 52 are sequentially moved from the distal region 52 to the recovery part 41 through the communication path 42 under the action of the centrifugal force. Here, the liquid to be treated is additionally supplied to the separation part 40, whereby a flow of the liquid to be treated is generated in the separation part 40. In a case where the dispersoids which are settled in the distal region 52 continue to be stored in the distal region 52, the dispersoids settled in the distal region 52 are first blown up due to the generated flow of the liquid to be treated, then moved toward the proximal region 53 side, and captured by the filter 54, or in a case where the filter 54 is omitted, there is a concern that the dispersoids may be discharged through the liquid-to-be-treated discharge port 51. In contrast, the dispersoids settled in the distal region 52 are sequentially moved to the recovery part 41, whereby the dispersoids are suppressed from being blown up due to the flow of the liquid to be treated, which is generated in the separation part 40. In this way, the separation efficiency of dispersoids is enhanced.

Then, the dispersoids moved to the recovery part 41 are stored in the recovery part 41 in a state of being concentrated in the recovery liquid in the recovery part 41, and recovered together with the recovery liquid, for example, when the dispersoids have reached the upper limit amount of the dispersoids which can be stored in the recovery part 41. In other words, it is possible to continue the centrifugal separation treatment until the upper limit amount is reached. The upper limit amount of the dispersoids which can be stored in the recovery part 41 is related to the volume of the recovery part 41, and the volume (shape) of the recovery part 41 is not particularly limited as long as the recovery part 41 is disposed on the distal side from the separation part 40. Therefore, even in a relatively large amount of liquid to be treated, it becomes possible to perform the centrifugal separation treatment at once by using the recovery part 41 having a corresponding volume, and thus work efficiency is enhanced. After the revolution of the centrifugal separation container 2 is stopped and the centrifugal separation container 2 is removed from the rotary table 11 (refer to FIG. 1) of the centrifugal separator 1, the dispersoids and the recovery liquid are sucked out and recovered from the recovery part 41 by, for example, a syringe. The recovery part 41 may be configured to be attachable to and detachable from the separation part 40, and in this case, the work of recovering the dispersoids and the recovery liquid is facilitated, and thus the work efficiency is further enhanced.

Figure 11:
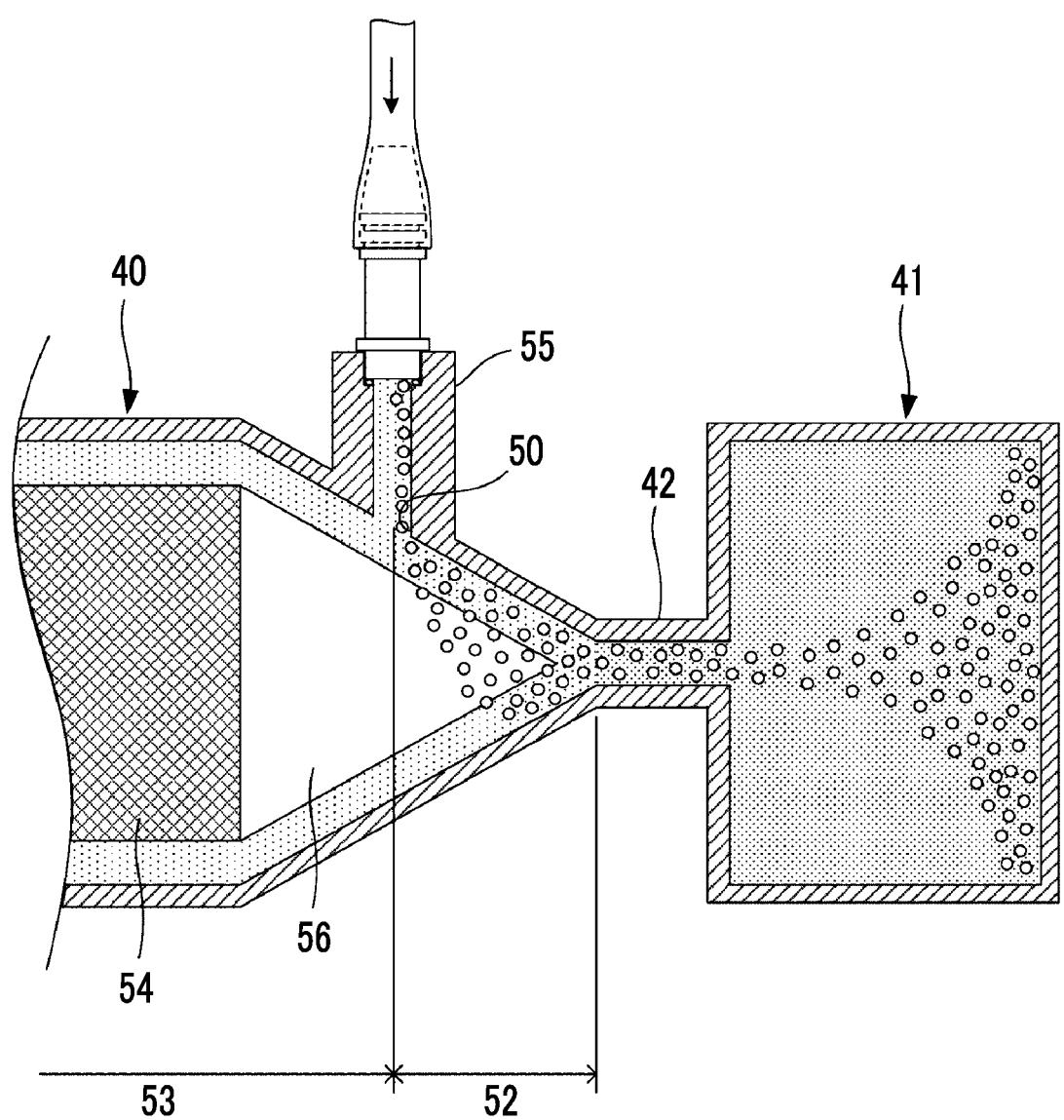
FIG. 11 is a schematic diagram of a longitudinal section of a modification example of the centrifugal separation container of FIG. 9.
Figure 12:
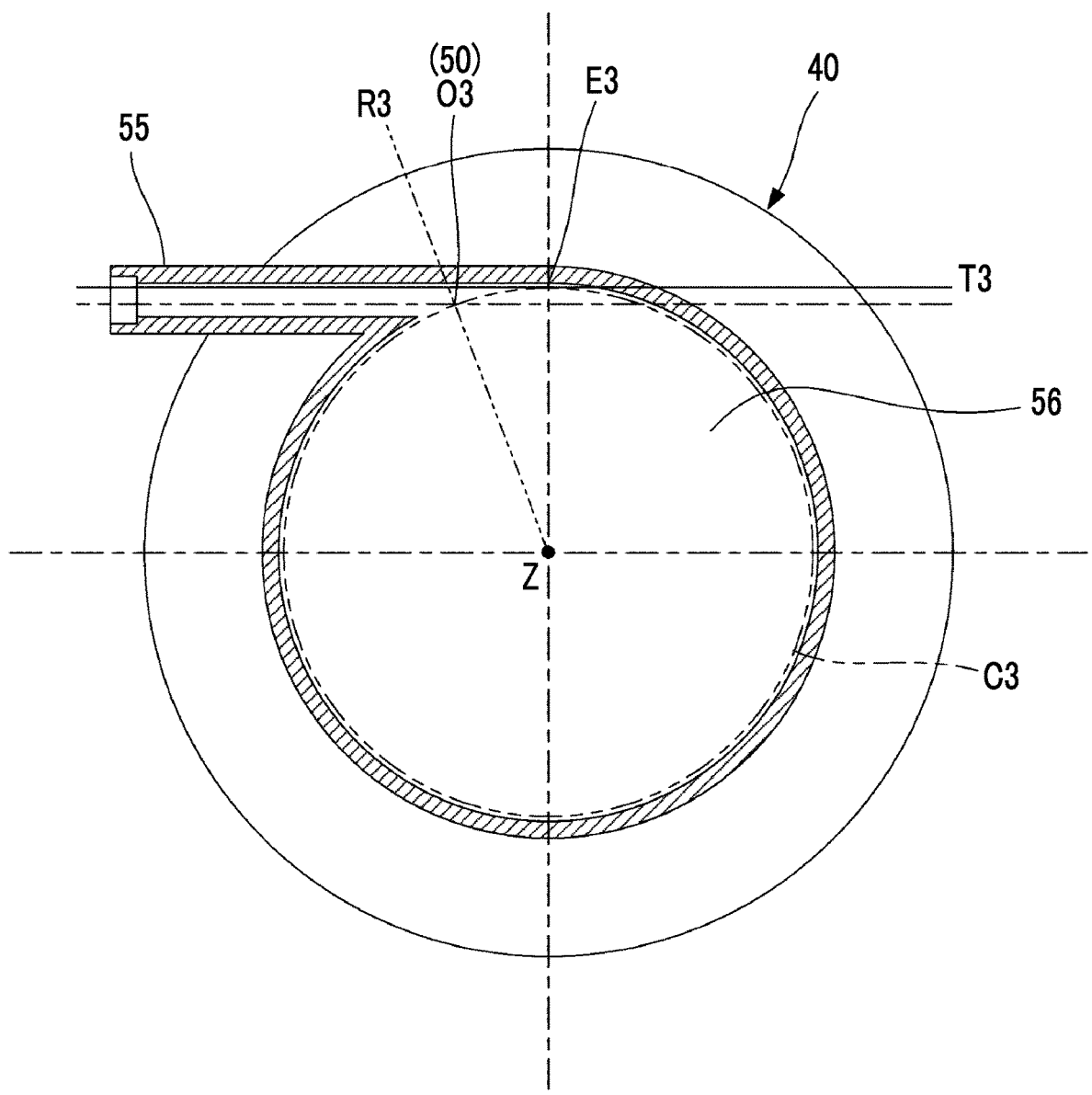
FIG. 12 is a schematic diagram of a transverse section of FIG. 11.

FIGS. 11 and 12 show a modification example of the centrifugal separation container 2.

From the viewpoint of enhancing the separation efficiency of the dispersoids, it is also effective to promptly lower the flow velocity of the liquid to be treated which flows into the separation part 40 and the moving velocity of the dispersoid contained in the liquid to be treated. In a case where the liquid to be treated and the dispersoid remain keeping the velocity, there is a concern that the dispersoids may be moved toward the proximal region 53 side with the flow of the liquid to be treated. In order to promptly lower the velocities of the liquid to be treated and the dispersoid, in this example, a rectifying body 56 is provided in the separation part 40.

The rectifying body 56 is accommodated across the distal region 52 and the proximal region 53 of the separation part 40 and is disposed to cover the liquid-to-be-treated supply port 50. Then, the rectifying body 56 is provided along the inner peripheral surface of the separation part 40 with a gap between itself and the inner peripheral surface of the separation part 40. As described above, the distal region 52 is formed in a tapered shape, and therefore, the rectifying body 56 is also formed in a tapered shape.

The liquid to be treated and the dispersoids which flow into the separation part 40 flow through the gap between the inner peripheral surface of the separation part 40 and the outer peripheral surface of the rectifying body 56. The flow velocity of the liquid to be treated which flows in the vicinity of each of the inner peripheral surface of the separation part 40 and the outer peripheral surface of the rectifying body 56 is lowered as it comes closer to the surface, and becomes substantially zero on the surface. The gap between the inner peripheral surface of the separation part 40 and the outer peripheral surface of the rectifying body 56 is appropriately narrowed within a range that does not interfere with the flow of the dispersoid, whereby the flow velocity of the liquid to be treated is lowered, the moving velocity of the dispersoid contained in the liquid to be treated is also lowered, and the dispersoids are stably settled in the distal region 52. In this way, the separation efficiency of the dispersoids is enhanced. The gap between the inner peripheral surface of the separation part 40 and the outer peripheral surface of the rectifying body 56 is appropriately in a range of 1 mm to 5 mm, for example, although it depends on the particle diameter of the dispersoid, or the like.

Here, as shown in FIG. 12, the joint portion 55 of the liquid-to-be-treated supply port 50 which is covered with the rectifying body 56 is preferably inclined in the circumferential direction of the separation part 40 with respect to a radial direction R3 extending to pass through a center O3 of the liquid-to-be-treated supply port 50 from the central axis Z of the separation part 40, and more preferably, the joint portion 55 extends, in a case where one end which is located on the side opposite to the central axis Z side of the separation part 40 across the central axis of the joint portion 55 of the liquid-to-be-treated supply port 50, out of both ends of the liquid-to-be-treated supply port 50 appearing in the cross section perpendicular to the central axis Z, is defined as an outer end E3, along a tangent line T3 at the outer end E3 of a circle C3 centered on the central axis Z and passing through the outer end E3. In this way, the liquid to be treated which flows into the separation part 40 through the liquid-to-be-treated supply port 50 is smoothly introduced into the gap between the inner peripheral surface of the separation part 40 and the outer peripheral surface of the rectifying body 56 and flows along both the peripheral surfaces, and thus the velocities of the liquid to be treated and the dispersoid are more effectively lowered.

Figure 13:
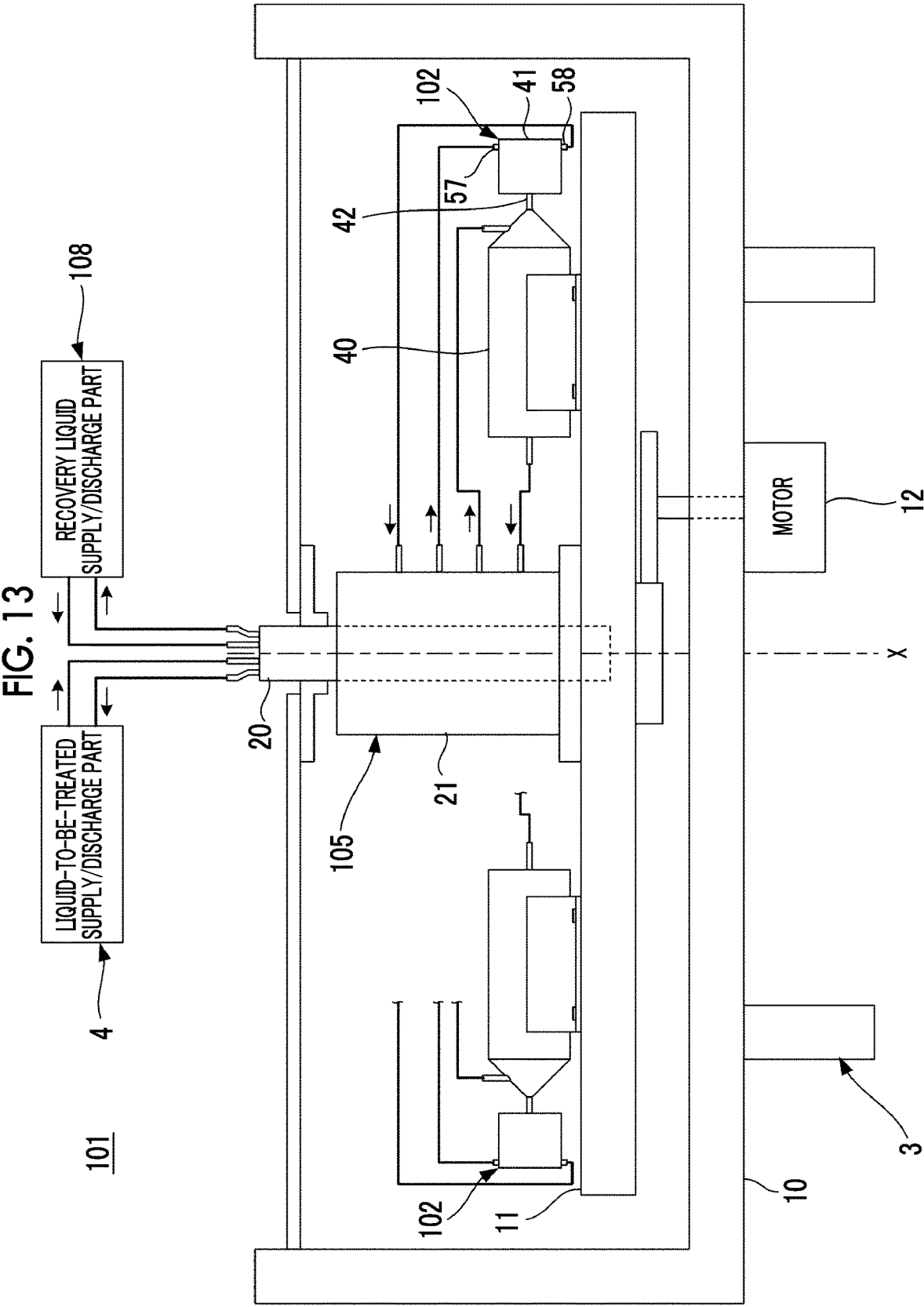
FIG. 13 is a schematic diagram of another example of the centrifugal separator and the centrifugal separation container, for describing an embodiment of the present invention.
Figure 14:
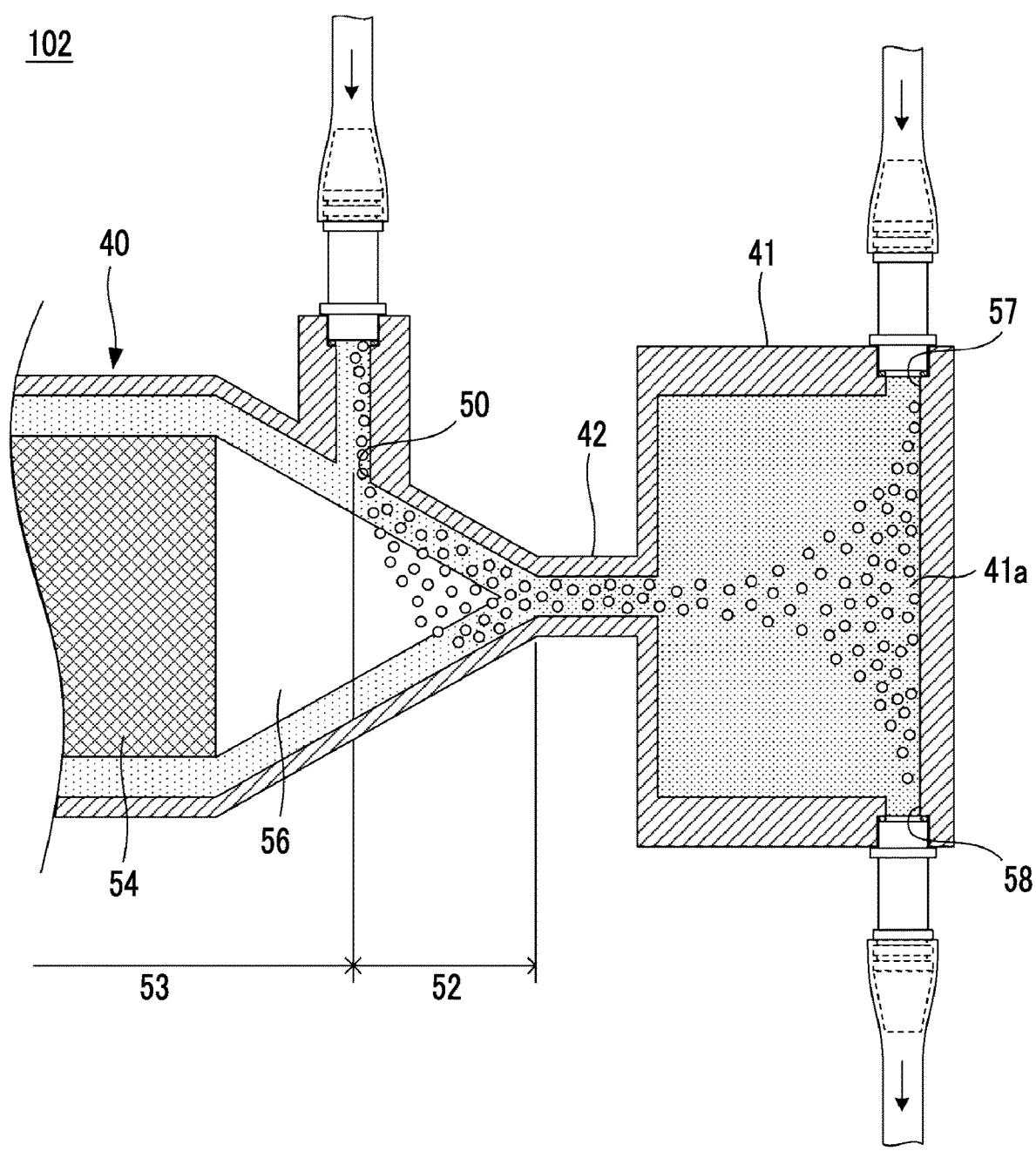
FIG. 14 is a schematic diagram of a longitudinal section of the centrifugal separation container of FIG. 13.
Figure 15:
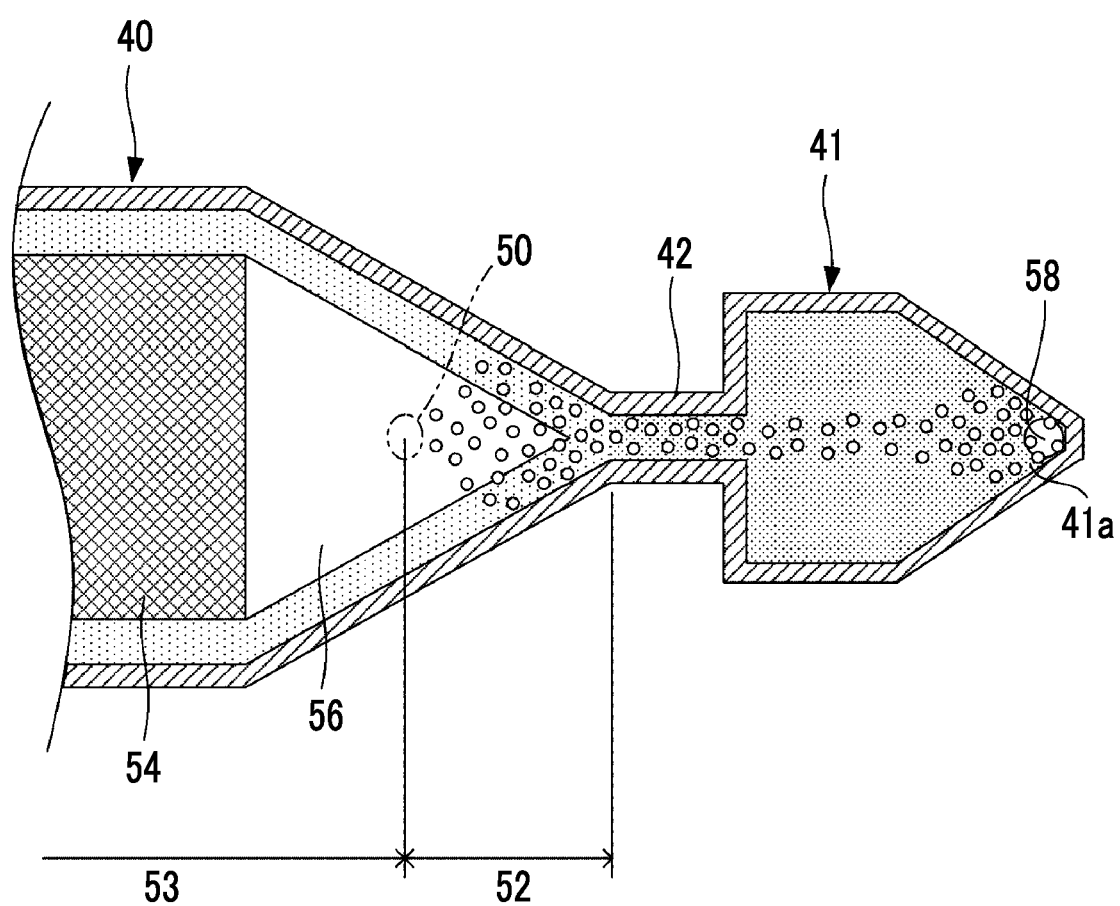
FIG. 15 is a schematic diagram of a transverse section of the centrifugal separation container of FIG. 13.

FIGS. 13 to 15 show another example of the centrifugal separator and the centrifugal separation container, for describing an embodiment of the present invention. Elements common to the centrifugal separator 1 and the centrifugal separation container 2 described above are denoted by the same reference numerals, and description thereof is omitted or simplified.

In the centrifugal separation container 2 described above, in a case where the dispersoids stored in the recovery part 41 are recovered, the revolution of the centrifugal separation container 2 is stopped and the centrifugal separation treatment of the liquid to be treated is also stopped. In contrast, in a centrifugal separation container 102 shown in FIGS. 13 to 15, a recovery liquid supply port 57 and a recovery liquid discharge port 58 are provided in the recovery part 41, and a centrifugal separator 101 further comprises a recovery liquid supply/discharge part 108 which supplies and discharges the recovery liquid to and from the recovery part 41, and is configured to be able to recover the dispersoids stored in the recovery part 41 in a state where the revolution of the centrifugal separation container 102 is continued.

The liquid to be treated is supplied from the liquid-to-be-treated supply/discharge part 4 to the separation part 40 of the centrifugal separation container 102 through a rotary joint 105 and discharged from the separation part 40 to the liquid-to-be-treated supply/discharge part 4 through the rotary joint 105. The recovery liquid is also likewise supplied from the recovery liquid supply/discharge part 108 to the recovery part 41 of the centrifugal separation container 102 through the rotary joint 105 and discharged from the recovery part 41 to the recovery liquid supply/discharge part 108 through the rotary joint 105. Although not shown in the drawings, the rotary joint 105 comprises the shaft-side supply flow path 30 and the shaft-side discharge flow path 31 provided in the shaft body 20, the tube-side supply flow path 32 and the tube-side discharge flow path 33 provided in the tube body 21, and a supply/discharge flow path for the liquid to be treated and a supply/discharge flow path for the recovery liquid with the supply communication flow path 34 and the discharge communication flow path 35 (refer to FIG. 2) which are provided between the outer peripheral surface of the shaft body 20 and the inner peripheral surface of the tube body 21 as a set of supply/discharge flow paths.

The recovery liquid which is supplied to the recovery part 41 flows into the recovery part 41 through the recovery liquid supply port 57. Then, the recovery liquid originally stored in the recovery part 41 is discharged from the recovery part 41 through the recovery liquid discharge port 58 according to the inflow of the recovery liquid into the recovery part 41. At this time, the dispersoids stored in the recovery part 41 are also discharged from the recovery part 41 together with the recovery liquid. The dispersoids discharged from the recovery part 41 are recovered in the recovery liquid supply/discharge part 108.

As shown in FIGS. 14 and 15, the dispersoids stored in the recovery part 41 are settled at a distal end portion 41a of the recovery part 41 under the action of the centrifugal force. The recovery liquid supply port 57 and the recovery liquid discharge port 58 are provided in the distal end portion 41a where the dispersoids are settled, and are provided to face each other. The recovery liquid supply port 57 and the recovery liquid discharge port 58 are provided to face each other, whereby occurrence of an unnecessary flow of the recovery liquid in the recovery part 41 is suppressed and dissipation of the dispersoids settled at the distal end portion 41a is suppressed. Then, the recovery liquid supply port 57 and the recovery liquid discharge port 58 are provided in the distal end portion 41a, whereby the dispersoids settled at the distal end portion 41a are placed under the action of the flow of the recovery liquid flowing from the recovery liquid supply port 57 toward the recovery liquid discharge port 58 and efficiently flows into the recovery liquid discharge port 58. In this way, the recovery efficiency of the dispersoids is enhanced.

From the viewpoint of enhancing the recovery efficiency of the dispersoids, it is preferable that the distal end portion 41a of the recovery part 41 is formed in a tapered shape having a cross-sectional area which gradually decreases toward the distal side. In this way, the dispersoids are densely packed under the action of the flow of the recovery liquid flowing from the recovery liquid supply port 57 toward the recovery liquid discharge port 58, and thus the recovery efficiency of the dispersoids is further enhanced.

In the centrifugal separation treatment using the centrifugal separator 101 comprising the centrifugal separation container 102, first, in a state where the separation part 40 is filled with the liquid to be treated and the recovery part 41 is filled with the recovery liquid, the centrifugal separation of the dispersoids contained in the liquid to be treated is started. After the centrifugal separation is started, the liquid to be treated is continuously or intermittently supplied to the separation part 40. In a case where the centrifugal separation is started, the dispersoids contained in the liquid to be treated which is supplied to the separation part 40 are settled in the distal region 52 of the separation part 40.

The dispersoids settled in the distal region 52 are sequentially moved from the distal region 52 to the recovery part 41 through the communication path 42 under the action of the centrifugal force. The dispersoids moved to the recovery part 41 are stored in the recovery part 41 in a state of being dispersed in the recovery liquid in the recovery part 41. The recovery liquid is supplied to the recovery part 41 continuously or intermittently at an appropriate timing (for example, a timing when the dispersoids stored in the recovery part 41 have reached the upper limit amount of the dispersoids which can be stored in the recovery part 41), and thus the dispersoids stored in the recovery part 41 are discharged from the recovery part 41.

The supply and discharge of the recovery liquid to and from the recovery part 41 are performed through the rotary joint 105, and therefore, the revolution of the centrifugal separation container 102 is continued even during a recovery liquid supply/discharge period. However, the revolving angular velocity of the centrifugal separation container 102 may be lowered in the recovery liquid supply/discharge period. The dispersoids stored in the recovery part 41 are pressed against the inner surface of the recovery part 41 under the action of the centrifugal force. However, the revolving angular velocity of the centrifugal separation container 102 is lowered, whereby the centrifugal force is weakened, and thus discharge of the dispersoids is promoted.

The dispersoids stored in the recovery part 41 are discharged from the recovery part 41 by the supply and discharge of the recovery liquid to and from the recovery part 41, whereby the recovery part 41 can store the dispersoids again, so that the centrifugal separation treatment is continued. In this way, even a very large amount of liquid to be treated can be subjected to the centrifugal separation treatment at once, and thus the work efficiency is further enhanced. Further, the dispersoids stored in the recovery part 41 are discharged and recovered from the recovery part 41 only by supplying the recovery liquid to the recovery part 41, and therefore, the recovery work is very easy and the work efficiency is further enhanced.

As described above, the rotary joint disclosed in this specification is a rotary joint which supplies and discharges a liquid to and from a container which is revolved around a rotation axis, the rotary joint comprising: a shaft body which is immovably installed; a tube body into which the shaft body is inserted and which is rotated around the shaft body; a shaft-side supply flow path which is provided in an interior of the shaft body and has an opening provided on an outer peripheral surface of the shaft body; a shaft-side discharge flow path which is provided in the interior of the shaft body and has an opening provided at a different position separated in an axial direction of the shaft body from the opening of the shaft-side supply flow path on the outer peripheral surface of the shaft body; a tube-side supply flow path which is provided to penetrate the tube body from an inner peripheral surface to an outer peripheral surface of the tube body and disposed at a position overlapping the opening of the shaft-side supply flow path in the axial direction of the shaft body; a tube-side discharge flow path which is provided to penetrate the tube body from the inner peripheral surface to the outer peripheral surface of the tube body and disposed at a position overlapping the opening of the shaft-side discharge flow path in the axial direction of the shaft body; a supply communication flow path which is provided in an annular shape around the shaft body between the outer peripheral surface of the shaft body and the inner peripheral surface of the tube body and makes the shaft-side supply flow path and the tube-side supply flow path communicate with each other; and a discharge communication flow path which is provided in an annular shape around the shaft body between the outer peripheral surface of the shaft body and the inner peripheral surface of the tube body and makes the shaft-side discharge flow path and the tube-side discharge flow path communicate with each other, in which the tube-side supply flow path is inclined in a direction opposite to a rotation direction of the tube body with respect to a radial direction which extends to pass through a center of a connection portion between the tube-side supply flow path and the supply communication flow path from the shaft body, and the tube-side discharge flow path is inclined in the same direction as the rotation direction of the tube body with respect to a radial direction which extends to pass through a center of a connection portion between the tube-side discharge flow path and the discharge communication flow path from the shaft body.

Further, in the rotary joint disclosed in this specification, the tube-side supply flow path extends, in a case where one end which is located on the side opposite to the shaft body side across a central axis of the tube-side supply flow path, out of both ends of the connection portion between the tube-side supply flow path and the supply communication flow path appearing in a cross section perpendicular to the shaft body, is defined as an outer end, along a tangent line at the outer end of a circle passing through the outer end around the shaft body, and the tube-side discharge flow path extends, in a case where one end which is located on the side opposite to the shaft body side across a central axis of the tube-side discharge flow path, out of both ends of the connection portion between the tube-side discharge flow path and the discharge communication flow path appearing in a cross section perpendicular to the shaft body, is defined as an outer end, along a tangent line at the outer end of a circle passing through the outer end around the shaft body.

Further, in the rotary joint disclosed in this specification, each of the supply communication flow path and the discharge communication flow path is formed by an annular concave portion provided on the inner peripheral surface of the tube body.

Further, the rotary joint disclosed in this specification further comprises: at least two bearings which are disposed at different positions in the axial direction of the shaft body between the shaft body and the tube body and rotatably support the tube body; and a plurality of seal members which are disposed between the shaft body and the tube body and isolate the supply communication flow path, the discharge communication flow path, and the bearings from each other.

Further, the centrifugal separator disclosed in this specification comprises: a liquid-to-be-treated supply/discharge part which is connected to the shaft-side supply flow path and the shaft-side discharge flow path of the rotary joint; a centrifugal separation container which is connected to the tube-side supply flow path and the tube-side discharge flow path of the rotary joint; and a drive part which holds the tube body of the rotary joint and the centrifugal separation container, rotates the tube body around the shaft body of the rotary joint, and revolves the centrifugal separation container around the shaft body, in which a liquid to be treated is supplied and discharged between the liquid-to-be-treated supply/discharge part and the centrifugal separation container through the rotary joint.

Further, the centrifugal separation container disclosed in this specification is a centrifugal separation container which is revolved around a rotation axis, the centrifugal separation container comprising: a separation part which includes a distal region which is disposed on the distal side from a liquid-to-be-treated supply port and a proximal region which is disposed on the proximal side from the liquid-to-be-treated supply port, with respect to the rotation axis and in which a liquid-to-be-treated discharge port is provided in the proximal region; and a recovery part which is disposed on the distal side from the distal region, communicates with a distal end portion of the distal region through a communication path, and is filled with a recovery liquid for dispersing dispersoids that are centrifuged, in a liquid to be treated.

Further, in the centrifugal separation container disclosed in this specification, the recovery part has a recovery liquid supply port and a recovery liquid discharge port.

Further, in the centrifugal separation container disclosed in this specification, the distal region is formed in a tapered shape having a cross-sectional area which gradually decreases toward the communication path.

Further, in the centrifugal separation container disclosed in this specification, the separation part is formed in a tubular shape, the liquid-to-be-treated supply port is formed in a peripheral wall of the separation part, and the distal region and the proximal region are provided adjacent to each other in an axial direction of the separation part.

Further, in the centrifugal separation container disclosed in this specification, the liquid-to-be-treated supply port is inclined in a circumferential direction of the separation part with respect to a radial direction which extends to pass through the center of the liquid-to-be-treated supply port from the central axis of the separation part.

Further, in the centrifugal separation container disclosed in this specification, the liquid-to-be-treated supply port extends, in a case where one end which is located on the side opposite to the central axis side of the separation part across the central axis of the liquid-to-be-treated supply port, out of both ends of the liquid-to-be-treated supply port appearing in a cross section perpendicular to the central axis of the separation part, is defined as an outer end, along a tangent line at the outer end of a circle centered on the central axis of the separation part and passing through the outer end.

Further, the centrifugal separation container disclosed in this specification further comprises a rectifying body which is accommodated across the distal region and the proximal region of the separation part and provided along an inner peripheral surface of the separation part with a gap between the rectifying body and the inner peripheral surface of the separation part.

Further, the centrifugal separation container disclosed in this specification further comprises a filter which is accommodated in the proximal region of the separation part and filters the liquid to be treated which flows into the liquid-to-be-treated discharge port.

Further, the centrifugal separator disclosed in this specification comprises: the centrifugal separation container; a drive part which holds the centrifugal separation container and revolves the centrifugal separation container around the rotation axis; and a liquid-to-be-treated supply/discharge part which is connected to the liquid-to-be-treated supply port and the liquid-to-be-treated discharge port provided in the separation part of the centrifugal separation container through a rotary joint which is installed on the rotation axis, and supplies and discharges the liquid to be treated to and from the centrifugal separation container.

Further, the centrifugal separator disclosed in this specification comprises: the centrifugal separation container; a drive part which holds the centrifugal separation container and revolves the centrifugal separation container around the rotation axis; a liquid-to-be-treated supply/discharge part which is connected to the liquid-to-be-treated supply port and the liquid-to-be-treated discharge port provided in the separation part of the centrifugal separation container through a rotary joint which is installed on the rotation axis, and supplies and discharges the liquid to be treated to and from the centrifugal separation container; and a recovery liquid supply/discharge part which is connected to the recovery liquid supply port and the recovery liquid discharge port provided in the recovery part of the centrifugal separation container through the rotary joint which is installed on the rotation axis, and supplies and discharges the recovery liquid to and from the recovery part.

The present invention can be used in the manufacturing or the like of, for example, pharmaceutical products and chemical products.

The embodiment of the present invention has been described above in detail. However, this is merely an example, and the present invention can be implemented in an aspect with various modifications added thereto within a scope which does not depart from the gist of the present invention. This application is based on the Japanese patent application (Patent Application No. 2017-002147) filed on Jan. 10, 2017, the content of which is incorporated herein by reference.

EXPLANATION OF REFERENCES

1: centrifugal separator
2: centrifugal separation container
3: drive part
4: liquid-to-be-treated supply/discharge part
5: rotary joint
6A, 6B: liquid sending pipe
7A, 7B: liquid sending pipe
10: stand
11: rotary table
12: motor
20: shaft body
21: tube body
22: bearing
23: seal member
30: shaft-side supply flow path
30$a$, 30$b$: opening
31: shaft-side discharge flow path
31$a$, 31$b$: opening
32: tube-side supply flow path
32$a$, 32$b$: opening
33: tube-side discharge flow path
33$a$, 33$b$: opening
34: supply communication flow path
35: discharge communication flow path
40: separation part
41: recovery part
41$a$: distal end portion
42: communication path
50: liquid-to-be-treated supply port
51: liquid-to-be-treated discharge port
52: distal region
52$a$: distal end portion
53: proximal region
54: filter
55: joint portion
56: rectifying body
57: recovery liquid supply port
58: recovery liquid discharge port
101: centrifugal separator
102: centrifugal separation container
105: rotary joint
108: recovery liquid supply/discharge part
C1, C2, C3: circle
E1, E2, E3: outer end
O1, O2, O3: center
R1, R2, R3: radial direction
T1, T2, T3: tangent line
X: rotation axis
Y: rotation direction
Z: central axis
$\theta 1, \theta 2, \theta 3, \theta 4$: angle
P1: inclination direction of tube-side supply flow path
P2: inclination direction of tube-side discharge flow path

What is claimed is:

1. A rotary joint which supplies and discharges a liquid to and from a container which is revolved around a rotation axis, the rotary joint comprising:
a shaft body which is immovably provided;
a tube body into which the shaft body is inserted and which is rotated around the shaft body;
a shaft-side supply flow path which is provided in an interior of the shaft body and has an opening provided on an outer peripheral surface of the shaft body;
a shaft-side discharge flow path which is provided in the interior of the shaft body and has an opening provided at a different position separated in an axial direction of the shaft body from the opening of the shaft-side supply flow path on the outer peripheral surface of the shaft body;
a tube-side supply flow path which is provided to penetrate the tube body from an inner peripheral surface to an outer peripheral surface of the tube body and disposed at a position overlapping the opening of the shaft-side supply flow path in the axial direction of the shaft body;
a tube-side discharge flow path which is provided to penetrate the tube body from the inner peripheral surface to the outer peripheral surface of the tube body and disposed at a position overlapping the opening of the shaft-side discharge flow path in the axial direction of the shaft body;
a supply communication flow path which is provided in an annular shape around the shaft body between the outer peripheral surface of the shaft body and the inner peripheral surface of the tube body and makes the shaft-side supply flow path and the tube-side supply flow path communicate with each other; and
a discharge communication flow path which is provided in an annular shape around the shaft body between the outer peripheral surface of the shaft body and the inner peripheral surface of the tube body and makes the shaft-side discharge flow path and the tube-side discharge flow path communicate with each other,
wherein the tube-side supply flow path is inclined in a direction opposite to a rotation direction of the tube body with respect to a radial direction which extends to pass through a center of a connection portion between the tube-side supply flow path and the supply communication flow path from the shaft body, and
the tube-side discharge flow path is inclined in a same direction as the rotation direction of the tube body with respect to a radial direction which extends to pass through a center of a connection portion between the tube-side discharge flow path and the discharge communication flow path from the shaft body.

2. The rotary joint according to claim 1,
wherein the tube-side supply flow path extends, in a case where one end which is located on a side opposite to a side of the shaft body across a central axis of the tube-side supply flow path, out of both ends of the connection portion between the tube-side supply flow path and the supply communication flow path appearing in a cross section perpendicular to the shaft body, is defined as an outer end, along a tangent line at the outer end of a circle passing through the outer end around the shaft body, and the tube-side discharge flow path extends, in a case where one end which is located on a side opposite to a side of the shaft body across a central axis of the tube-side discharge flow path, out of both ends of the connection portion between the tube-side discharge flow path and the discharge communication flow path appearing in a cross section perpendicular to the shaft body, is defined as an outer end, along a tangent line at the outer end of a circle passing through the outer end around the shaft body.

3. The rotary joint according to claim 2,
wherein each of the supply communication flow path and the discharge communication flow path is formed by an annular concave portion provided on the inner peripheral surface of the tube body.

4. The rotary joint according to claim 3, further comprising:
at least two bearings which are disposed at different positions in the axial direction of the shaft body between the shaft body and the tube body and rotatably support the tube body; and
a plurality of seal members which are disposed between the shaft body and the tube body and isolate the supply communication flow path, the discharge communication flow path, and the bearings from each other.

5. The rotary joint according to claim 2, further comprising:
at least two bearings which are disposed at different positions in the axial direction of the shaft body between the shaft body and the tube body and rotatably support the tube body; and
a plurality of seal members which are disposed between the shaft body and the tube body and isolate the supply communication flow path, the discharge communication flow path, and the bearings from each other.

6. The rotary joint according to claim 1,
wherein each of the supply communication flow path and the discharge communication flow path is formed by an annular concave portion provided on the inner peripheral surface of the tube body.

7. The rotary joint according to claim 6, further comprising:
at least two bearings which are disposed at different positions in the axial direction of the shaft body between the shaft body and the tube body and rotatably support the tube body; and
a plurality of seal members which are disposed between the shaft body and the tube body and isolate the supply communication flow path, the discharge communication flow path, and the bearings from each other.

8. The rotary joint according to claim 1, further comprising:
at least two bearings which are disposed at different positions in the axial direction of the shaft body between the shaft body and the tube body and rotatably support the tube body; and
a plurality of seal members which are disposed between the shaft body and the tube body and isolate the supply communication flow path, the discharge communication flow path, and the bearings from each other.

9. A centrifugal separator comprising:
the rotary joint according to claim 1;
a liquid-to-be-treated supply/discharge part which is connected to the shaft-side supply flow path and the shaft-side discharge flow path of the rotary joint;
a centrifugal separation container which is connected to the tube-side supply flow path and the tube-side discharge flow path of the rotary joint; and
a drive part which holds the tube body of the rotary joint and the centrifugal separation container, rotates the tube body around the shaft body of the rotary joint, and revolves the centrifugal separation container around the shaft body,
wherein the liquid-to-be-treated supply/discharge part supplies and discharges a liquid to be treated to and from the centrifugal separation container through the rotary joint.

10. The rotary joint according to claim 1,
wherein the opening of the shaft-side supply flow path has a tapered shape having a cross-sectional area which gradually increases toward a side of the supply communication flow path, and the opening of the shaft-side discharge flow path has a tapered shape having a cross-sectional area which gradually increases toward a side of the discharge communication flow path.

11. The rotary joint according to claim 1,
wherein each of the supply communication flow path and the discharge communication flow path is formed by an annular concave portion provided on the inner peripheral surface of the tube body.

* * * * *